US011112137B2

(12) United States Patent
Bailey et al.

(10) Patent No.: US 11,112,137 B2
(45) Date of Patent: Sep. 7, 2021

(54) HVAC PERFORMANCE MONITORING SYSTEM

(71) Applicant: CENTRICA HIVE LIMITED, Windsor (GB)

(72) Inventors: Nicholas James Bailey, Histon (GB); Christiaan Erdbrink, Windsor (GB); Ryszard Maciol, Windsor (GB); Miroslav Hamouz, Windsor (GB); Jim Anning, Reading (GB)

(73) Assignee: Centrica Hive Limited, Windsor (GB)

( * ) Notice: Subject to any disclaimer, the term of this patent is extended or adjusted under 35 U.S.C. 154(b) by 235 days.

(21) Appl. No.: 16/343,483

(22) PCT Filed: Oct. 18, 2017

(86) PCT No.: PCT/GB2017/053156
§ 371 (c)(1),
(2) Date: Apr. 19, 2019

(87) PCT Pub. No.: WO2018/073590
PCT Pub. Date: Apr. 26, 2018

(65) Prior Publication Data
US 2019/0264936 A1   Aug. 29, 2019

(30) Foreign Application Priority Data
Oct. 21, 2016   (GB) ..................................... 1617877

(51) Int. Cl.
*F24F 11/30*   (2018.01)
*F24F 11/64*   (2018.01)
(Continued)

(52) U.S. Cl.
CPC .............. *F24F 11/30* (2018.01); *F24F 11/64* (2018.01); *F24F 11/65* (2018.01); *G05B 15/02* (2013.01);
(Continued)

(58) Field of Classification Search
None
See application file for complete search history.

(56) References Cited

U.S. PATENT DOCUMENTS

2012/0065935 A1   3/2012   Steinberg et al.
2013/0308674 A1   11/2013   Kramer et al.
(Continued)

FOREIGN PATENT DOCUMENTS

CA   2344908 A1   1/2002

OTHER PUBLICATIONS

United Kingdom, UK Search Report for GB1617877.4, dated Apr. 25, 2017, 7 pages.
(Continued)

*Primary Examiner* — Paul B Yanchus, III
(74) *Attorney, Agent, or Firm* — Tucker Ellis LLP

(57) ABSTRACT

The present invention relates to environmental control systems. More particularly, the present invention relates to methods and apparatus for monitoring the performance of environmental control systems arranged to control at least one environmental characteristic in an environment. The method comprises: identifying an activation period during which the environmental control system is expected to be activated to control an environmental characteristic; recording a data set of sensor data measured during the activation period relating to the environmental characteristic; receiving control data indicating a target value configured at the environmental control system for the environmental characteristic; analysing the sensor data set in dependence on the target value to determine whether the sensor data is consistent with an expected response of the environmental characteristic during the activation period; and detecting an underperformance condition in response to determining that the sensor data is not consistent with the expected response.

19 Claims, 16 Drawing Sheets

(51) Int. Cl.
  *F24F 11/65*  (2018.01)
  *G05B 15/02*  (2006.01)
  *F24D 19/10*  (2006.01)

(52) U.S. Cl.
  CPC .. *F24D 19/1006* (2013.01); *G05B 2219/2642* (2013.01)

(56) References Cited

U.S. PATENT DOCUMENTS

| | | |
|---|---|---|
| 2014/0266755 A1 | 9/2014 | Arensmeier et al. |
| 2016/0138819 A1* | 5/2016 | Vega ........................ F24F 11/30 700/276 |
| 2016/0210842 A1 | 7/2016 | Gokhale et al. |
| 2016/0215996 A1 | 7/2016 | Blair et al. |

OTHER PUBLICATIONS

PCT International Search Report and Written Opinion from International Application No. PCT/GB2017/053156, dated Mar. 23, 2018, 13 pages.

\* cited by examiner

HVAC PERFORMANCE MONITORING SYSTEM

CROSS-REFERENCE TO RELATED APPLICATIONS

This application is a national phase application of International Application No PCT/GB2017/053156, filed Oct. 18, 2017, which claims priority to Great Britain Patent Application Serial No. 1617877.4, filed Oct. 21, 2016, all of which are incorporated herein by reference.

BACKGROUND

The present invention relates, but is not limited, to systems and methods for monitoring environmental control systems. More particularly, the present invention relates to determining faults in heating, ventilation and air conditioning (HVAC) systems.

HVAC systems can fail catastrophically, for example if the boiler breaks while the house is unoccupied during the day. A user may only realise that this has happened when they return home to a cold house. It will likely be the following day before an engineer can be requested.

Alternatively HVAC systems can degrade over time, leading to underperformance of the HVAC system. Components can fail less catastrophically, for example leading to leakage between heating systems circuits. Other systems might be incorrectly installed, but the user may not be aware of this.

One example of an underperformance is when a central heating system appears to function normally but is unable to achieve or maintain a desired target temperature.

One approach to monitoring a central heating boiler involves obtaining internal diagnostic information from the boiler in order to predict when the boiler has failed. However, this requires a suitably equipped boiler with inbuilt diagnostics and communications functionality.

SUMMARY

Embodiments of the invention seek to address some of the deficiencies of known approaches to monitoring HVAC performance.

Aspects of the invention are set out in the independent claims and preferred features are set out in the dependent claims.

There is described herein a method of monitoring the performance of an environmental control system arranged to control at least one environmental characteristic in an environment, the method comprising: identifying an activation period during which the environmental control system is expected to be activated to control an environmental characteristic; recording a data set of sensor data measured during the activation period relating to the environmental characteristic; receiving control data indicating a target value configured at the environmental control system for the environmental characteristic; analysing the sensor data set in dependence on the target value to determine whether the sensor data is consistent with an expected response of the environmental characteristic during the activation period; and detecting an underperformance condition in response to determining that the sensor data is not consistent with the expected response.

An activation period preferably refers to the time for which the environmental control system, or a component thereof, is in operation to alter or maintain the environmental characteristic, or during which the system or component should ordinarily be in operation (e.g. as indicated by a control signal or schedule), even if it is not actually active (e.g. due to a fault). An activation period may also be referred to as an "operational period".

Preferably identifying the activation period comprises detecting the start and/or end of the activation period.

Preferably one or both of the start and end of the activation period are detected in dependence on a control signal used to control the environmental control system.

Preferably the control signal is a control signal for controlling a component of the environmental control system adapted to influence the environmental characteristic. Preferably the component is a heating or cooling device. The component may be one of: a boiler; an air conditioning unit; a furnace; a heat pump; a fan; and a dehumidifier. For example, where the environmental control system is configured to regulate room temperature, the control signal may be a "call for heat" signal. The call for heat signal may be directed to a boiler. The sensor data may be, for example, one of: temperature; water temperature; pressure; and humidity. Where the sensor data is temperature data, it may refer to: water temperature, or room or other ambient temperature; e.g. if a boiler heats domestic hot water, the water temperature in or exiting a hot water tank may be suitable and if a boiler heats a swimming pool, the pool water temperature may be measured.

The control signal may be received from a control component of the environmental control system, preferably from a thermostat.

Preferably one or both of the start and end of the activation period are detected in dependence on a change in the target value specified in the control data and/or a difference between the target value and a current value of the environmental characteristic. In other words, it may be inferred that the system or component should be active instead of or in addition to relying on a specific activation signal.

Preferably the method comprises one or both of: inferring the start of the activation period in response to detecting a current measured value of the environmental control characteristic not meeting the target value; and/or inferring the end of the activation period in response to detecting a current measured value of the environmental control characteristic meeting the target value. For example, for a heating system, meeting the target value may mean that a measured temperature is equal to or exceeds the target value. Whereas a cooling or air conditioning system, meeting the target value may be when the temperature is equal to or falls below the target.

For example, the method comprises detecting the start of the activation period, for a heating system, in response to identifying an increase in a target temperature above a currently measured temperature or, for a cooling system, in response to identifying a decrease in target temperature below a currently measured temperature.

In some embodiments, receiving control data comprises accessing a control schedule configured at the environmental control system, the control schedule specifying one or more control set points, each control set point specifying a target value for the environmental characteristic applicable at a respective time. The respective time may be point in time or it may be a time period.

Preferably detecting the start and/or end of the activation is period based on the control schedule.

Preferably the environmental characteristic is a temperature of the environment. A control set point or target value may specify a target temperature for the environment.

Preferably the analysed data set additionally includes one or both of: sensor data for a period preceding (preferably immediately preceding) the start of the activation period; sensor data for a period following (preferably immediately following) the end of the activation period. In this case the analysis to determine expected behaviour may be extended to consider the whole measurement period (i.e. including the activation period and the preceding and/or following periods), e.g. to determine whether the sensor data is consistent with the expected response over all or part of the measurement period including the activation period and the preceding and/or following periods.

Preferably the method includes periodically recording sensor data relating to the environmental characteristic from at least one environmental sensor in a sensor log; and, in response to identifying the activation period, generating the data set for analysis based on the sensor log.

Preferably the method further comprises, in response to identifying the start of the activation period: adding previously recorded sensor data for a predetermined duration prior to the start of the activation period from the log to the data set for analysis; adding further sensor data received during the activation period to the data set; after detection of the end of the activation period, continuing to store sensor data received from the environmental sensor to the data set; and terminating recording of sensor data to the data set a predetermined duration after the end of the activation period.

The predetermined durations or time periods before and/or after the activation period may be equal or they may be different. The predetermined durations may be around 5 minutes, 10 minutes, 20 minutes, 40 minutes or one hour. Preferably the predetermined durations are between 20 and 40 minutes. More preferably the predetermined durations are around 30 minutes.

After terminating recording of sensor data, the method may further comprise continuing to record environmental sensor in the sensor log.

Preferably the analysing step comprises determining whether the sensor data indicates that the target value is substantially attained and/or maintained during the activation period.

Preferably the detecting step comprises detecting an underperformance condition in response to the target value not being substantially attained and/or maintained during the activation period.

Preferably the analysis of the sensor data determines underperformance conditions based on one or more of: a duration of the activation period; a change of the environmental characteristic over the course of the activation period; a rate of change of the environmental characteristic during the activation period, preferably determined at or near the beginning of the period and/or at or near the end of the period; a difference between one or more measured values of the environmental characteristic during the activation period and the target value, and/or an average or integral of said difference over the activation period. In some embodiments the determination of underperformance conditions may alternatively or additionally be based on sensor measurements (e.g. temperature) over the activation period, such as the time to the minimum and maximum temperature. For example, if the minimum temperature is reached late in the heating period this can suggest that there is a problem.

The determination of underperformance conditions may also or alternatively be based on the average rate of change of the environmental characteristic over the activation period.

Preferably analysing the sensor data to determine whether the sensor data is consistent with an expected response of the environmental characteristic during the period comprises determining whether the sensor data meets at least one of a set of one or more predetermined fault conditions.

Preferably the environmental characteristic is temperature, the predetermined fault conditions comprising one or more of: detecting a lack of increase in temperature or a reduction in temperature during the activation period, the activation period intended to increase the temperature; detecting a lack of reduction in temperature or an increase in temperature during the activation period, the activation period intended to reduce the temperature; detecting a steady state temperature achieved or maintained during the activation period which differs from a target value specified in a control schedule, preferably by more than a threshold amount; detecting a temperature change indicative of activation of the environmental control system in a period immediately preceding or following the activation period; detecting an irregular pattern of temperature variation during the activation period; detecting a correlation between environmental temperature variations during the activation period and the operation of, or a control signal intended for the operation of, a system other than an environmental temperature control component intended to regulate the environmental temperature, preferably wherein the other system is for heating of water in a hot water supply system for supplying heated water to water outlets.

Preferably the method further comprises alerting a user associated with the environmental control system in response to detecting the underperformance condition, the alerting preferably comprising one or more of: displaying an alert on a display associated with the environmental control system; and transmitting an alert message to a user device associated with the user, preferably a personal or mobile computing or communications device. The message may indicate what sort of repair or maintenance is required, and may provide a user or engineer with information relating to the underperformance condition which helps to diagnose a fault. The message may also give the user the option of automatically requesting an engineer or repair service.

Preferably the method further comprises classifying an underperformance condition of the environmental control system based on one or more of: a severity of the condition, and a type of the condition; and alerting a user and/or a service/support operator in dependence on the classification.

Preferably the method comprises, in response to detecting the underperformance condition, initiating a test procedure for testing the environmental control system.

Preferably the test procedure comprises: activating the environmental control system, the activating optionally overriding a control schedule active for the environmental control system, measuring changes in the environmental characteristic in response to activation of the environmental control system; and performing further analysis of measured sensor data relating to the environmental characteristic to identify, quantify and/or classify the underperformance condition.

Preferably the method is performed at a data analysis system and comprises the steps of: receiving from the environmental control system over a computer network, e.g. a Wide Area Network (WAN) such as the Internet, one or more of: sensor data relating to the environmental characteristic, environmental control system control signals, and control schedule data; and performing the analysis based on the received data.

Preferably the method further comprises performing the analysis by an analysis module asynchronously with the data collection.

Preferably the method comprises at a data collection module: detecting the activation period and storing the sensor data set relating to the activation period in a data object; and at an analysis module: receiving the data object and performing the analysis of the sensor data; preferably wherein the data analysis transmits the data object or a reference thereto to the analysis module via a message queue.

Preferably the data collection module comprises a plurality of data collection processes or threads operating in parallel, the method comprising receiving data from each of a plurality of environmental control systems at a respective data collection process or thread.

Preferably detecting correct operation of the environmental control system in response to determining that the sensor data is consistent with the expected response, preferably if the environmental characteristic changes responsive to activation at a rate corresponding to a predetermined expected rate and/or if the environmental characteristic reaches a steady state value during the activation period consistent with the target value.

Preferably the method comprises creating a model of expected behaviour based on activation periods identified following analysis as representing correct operation of the environmental control system, and using the model to determine underperformance in later activation periods.

In preferred embodiments, analysing the sensor data set in dependence on the target value to determine whether the sensor data is consistent with an expected response of the environmental characteristic during the activation period, comprises determining a plurality of parameters based on the sensor data set, the parameters preferably relating to operation and/or performance of the environmental control system and/or the controlled environment, and applying a classification model to the parameters, the classification model arranged to classify the activation period based on the parameters (e.g. as exhibiting expected or abnormal behaviour). The classification model is preferably generated (e.g. using a machine learning/regression technique) based on a set of training samples (which may relate to the environmental control system and/or to one or more other environmental control systems installed at other locations).

Preferably the method comprises, in response to determining that the data set is consistent with the expected response, analysing the data set to determine one or more thermal parameters of the environmental control system and/or the associated environment, and using the one or more thermal parameters in the analysing step for a subsequent activation period, the one or more thermal parameters optionally including an expected rate of change of the environmental characteristic responsive to activation of the environmental control system. In some embodiments data quality is also monitored. If the monitoring system is providing data of too low a quality (e.g. missing data points etc.), then the user can be alerted that the monitoring system might not be adequately installed.

There is also described herein a monitoring system having means (e.g. in the form of a processor with associated memory) for performing a method as set out above.

According to another aspect, there is described an environmental control system arranged to control at least one environmental characteristic in an environment, the device comprising: means for identifying an activation period during which the environmental control system is expected to be activated to control an environmental characteristic; means for recording a data set of sensor data measured during the activation period relating to the environmental characteristic; and means for transmitting the data set to an analysis server for analysis.

There is also described an analysis server for monitoring the performance of an environmental control system arranged to control at least one environmental characteristic in an environment, the server comprising: means for receiving from a monitoring device associated with the environmental control system a data set of sensor data relating to the environmental characteristic measured during an activation period of the environmental control system; means for receiving control data indicating a target value configured at the environmental control system for the environmental characteristic; means for analysing the sensor data set in dependence on the target value to determine whether the sensor data is consistent with an expected response of the environmental characteristic during the activation period; and means for detecting an underperformance condition in response to determining that the sensor data is not consistent with the expected response.

Preferably the device or server may be arranged to perform or participate in a method as set out above.

There is also described a tangible, non-transitory computer-readable medium comprising software code adapted, when executed on a data processing apparatus, to perform a method as set out above.

Where reference is made above to means for performing a given processing step, such means may be provided in the form of a processor with associated memory (e.g. storing software code for execution by the processor).

Any feature in one aspect of the invention may be applied to other aspects of the invention, in any appropriate combination. In particular, method features may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

BRIEF DESCRIPTION OF THE DRAWINGS

Embodiments will now be described, by way of example only and with reference to the accompanying drawings, in which.

DETAILED DESCRIPTION

Particular embodiments provide a method and/or device which monitors the environment of a house or other building in order to determine an HVAC system failure. By automatically detecting faults, the mean time to repair the system can be reduced. Using this device and/or method it is possible to identify different types of system failure by analysing how one or more characteristics of the house or building environment behave. For example, by monitoring the performance of the thermal environment (i.e. the temperature over time) it is possible to determine faults in a boiler.

It has been unexpectedly found that failures in boilers, heating and air conditioning units can be identified from room temperature measurements made by a single temperature sensor. Since only a single temperature monitor/sensor is required, the monitoring device can be installed very simply, for example the monitoring device can be self-installed by the user as a retrofit.

The method and/or device can monitor all aspects of the HVAC system and the thermal performance of the house. The monitoring method and/or device can provide the ability to monitor how the environment responds to the activity of the HVAC device (e.g. a boiler), rather than measuring the operation of the HVAC device directly.

The monitoring method and device may be able to identify subtle modes of failure which might not be obvious to an occupant.

The present invention can be provided in an HVAC monitoring device which monitors the internal room temperature and knows the scheduled target temperature (i.e. the temperature selected by the user). By monitoring this data it may be possible to reveal a number of failure modes, some of which are described below.

In a further aspect, on detection of a failure the monitoring device may alert the user with relevant information and might propose a test procedure relevant to the issue detected. The user can then choose to run the test. In one embodiment, functionality is provided for performing a heating test cycle to confirm whether or not a failure has actually occurred. In order to run such a test, the HVAC monitoring device may be able to activate the HVAC unit either directly (via a power control signal to a relay switch) or via manipulation of the target temperature.

Following the positive outcome of the test an engineer can be requested and given prior knowledge of the system's determined mode of failure.

While parts of the following description relate to a heating system and a boiler in particular, use of the described techniques in other types of environmental control systems such as a cooling, a humidity controlled ventilation system and an air conditioning system, for example, is also contemplated.

Figure 1:
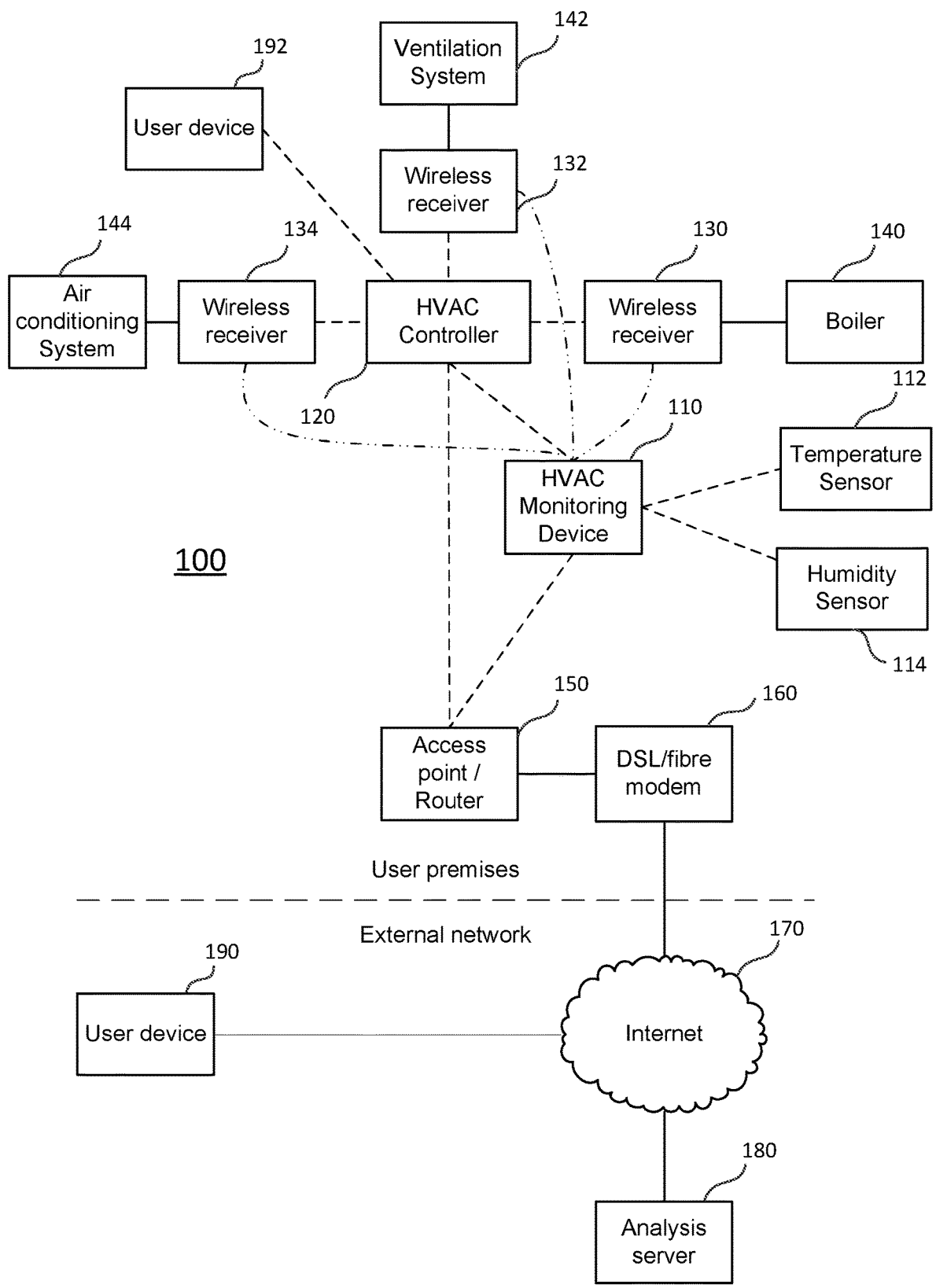
FIG. 1 illustrates a system diagram of an exemplary environmental control and monitoring system.

FIG. 1 illustrates a system diagram of an exemplary environmental control and monitoring system 100. The HVAC control and monitoring system 100 includes an HVAC monitoring device 110 installed in a user's premises. The HVAC monitoring device 110 is wirelessly connected to a temperature sensor 112 and a humidity sensor 114 installed within the user's premises. However the sensors 112, 114 may be combined in the HVAC monitoring device 110. Alternatively the sensors 112,114 may communicate with the HVAC monitoring device 110 via wired connections.

The HVAC monitoring device 110 is in wireless communication with an HVAC controller 120. The HVAC controller 120 may be, for example, a smart thermostat into which a user can program a heating, hot water or other environmental control schedule. Of course, the HVAC monitoring device 110 itself (optionally, along with the temperature sensor 112 and humidity sensor 114) could be incorporated into the HVAC controller 120, and/or may make use of one or more sensors (e.g. temperature and/or humidity) already provided in the thermostat.

The HVAC monitoring device 110 and HVAC controller 120 are connected wirelessly to the user's local network/internet access infrastructure, for example, to a wireless or wired home router/access point 150, which in turn provides access to the Internet 170 through a modem 160, such as an ADSL or fibre modem. Depending on access technology, router 150 and modem 160 may be combined in a single device or replaced with other access devices appropriate to the access technology. Some embodiments may provide an additional hub device (not shown), e.g. connected to the boiler (incorporating wireless receiver 130), to manage the HVAC system and coordinate between the components, store control/configuration data (e.g. heating schedules), and the like (such functionality may alternatively be implemented in the HVAC controller 120).

The HVAC controller 120 is wirelessly connected to three wireless receivers 130, 132, 134. One wireless receiver 130 is connected by a wired connection to a central heating/hot water boiler 140, another wireless receiver 132 is connected by a wired connection to a ventilation system 142 and the third wireless receiver 134 is connected by a wired connection to an air conditioning system 144. The boiler 140 may, for example, be a conventional gas boiler arranged to provide a supply of heated water to a series of radiators in the user's premises and to a hot water tank for onward supply to hot water taps. The ventilation system 142 may be, for example, a humidity controlled ventilation system.

Although three HVAC components 140, 142, 144 (and therefore three wireless receivers 130, 132, 134) are shown, in some embodiments only one or two HVAC components may be provided, whilst in other embodiments there may be more and/or different HVAC components with wireless receivers which can communicate wirelessly with the HVAC controller 120. In some embodiments the wireless receivers can be included in the HVAC components, such as the boiler or air conditioning system, rather than being provided as separate devices.

The HVAC controller 120 can store schedule and other information relevant to the control information of the HVAC components. The HVAC controller 120 can then send control and/or schedule information to the wireless receivers 130, 132, 134. For example the user can program a schedule for hot water at the HVAC controller 120, and the HVAC controller 120 can then send the hot water schedule to the wireless receiver 130. The wireless receiver 130 can then use the schedule and temperature information received from the HVAC controller 120 to turn the boiler 140 on or off as needed. Alternatively, the HVAC controller 120 may send a control signal to the wireless receiver 130 to instruct the boiler 140 to start or stop producing hot water each time hot water is required according to the schedule.

The user can also program space heating or other environmental control requirements into the HVAC controller 120. Typically, this involves programming a heating schedule specifying a set of heating set points applicable during respective time periods, each set point defining a target temperature value to be achieved and maintained during the period. For example, the user may request a room temperature of 20° C. between 7 am and 9 am. Other periods in the schedule may be designated as "off" periods where no heating is required (though the system may nevertheless apply some minimum target e.g. 5° C. during such periods to protect against frost damage). The HVAC controller 120 receives a room temperature reading (either from its own internal temperature sensor, or from temperature sensor 112) and can provide control signals to the boiler 140 (via wireless receiver 130) or to the air conditioning system 144 (via wireless receiver 134), as appropriate (e.g. to increase or decrease the temperature back to the scheduled target value).

The user may also interact with the HVAC system from a user device 190 located outside the user's premises on an external network and connected to the Internet 170. In some embodiments a user device 192 is located at the user premises and can be connected wirelessly (or by wired connections) to the user's local network, e.g. as shown the user device 192 can be in wireless communication with the HVAC controller 120. User devices 190, 192 may take the form of smartphones, tablet computers, personal computers, and the like. User devices may include an application for controlling the heating system, for example to create or edit a heating/hot water schedule, switch between manual/scheduled operation, adjust temperature, activate boost mode, etc. The application may then send information to the HVAC controller 120 as required (e.g. to update a schedule).

The HVAC controller 120 sends to the HVAC monitoring device 110 the control schedule and/or any control commands sent to the HVAC components. The temperature sensor 112 and the humidity sensor 114 take readings frequently, e.g. every 2 minutes, and send the readings to the HVAC monitoring device 110. The HVAC monitoring device 110 can log the received schedule, control commands and readings.

The HVAC monitoring device 110 can also alternatively send the control information and sensed information to a remote datacentre such as analysis server 180 on an external network, e.g. via its connection to the Internet 170. The remote datacentre 180 can log this information and store for analysis information ascribed to periods during which HVAC components are operating (as described in more detail below). Alternatively, the logging, storage and analysis process can be performed at the HVAC monitoring device 110, without the need for a remote datacentre 180.

While this description has focused on the home environment, the invention can also be used in offices or other premises in which environmental conditions such as room temperature and humidity are controlled.

Although only a single temperature sensor and a single humidity sensor installed in at least one room in the user's premises are described above, in some embodiments multiple sensors may be provided at different locations within the premises so that more information about the performance of the HVAC system can be collected. In some cases multiple sensors can improve the accuracy of the monitoring.

It is also possible to position sensors outside the environment controlled by the HVAC system (e.g. air temperature and humidity sensor located outside a house). By measuring outside characteristics, it may be possible to get further insights into the performance of the system (e.g. more heat may be required to maintain a target room temperature if it is colder outside).

Figure 2:
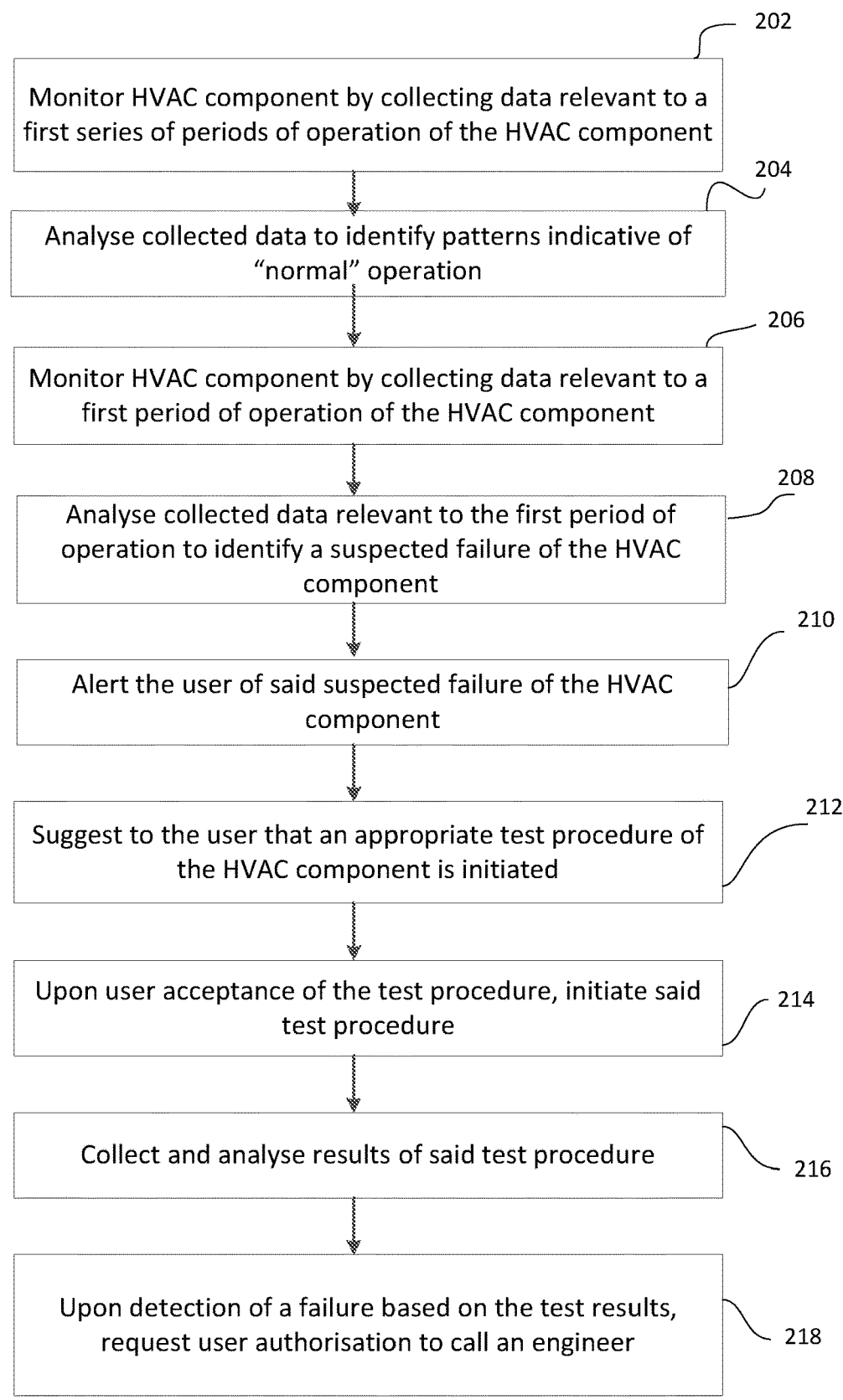
FIG. 2 is a flow diagram of an exemplary process for monitoring an environmental control system.

FIG. 2 shows an exemplary method 200 for monitoring an HVAC/environmental control system 100 as described above and shown in FIG. 1. At step 202 the HVAC component is monitored by collecting data relevant to a series of periods of operation of the HVAC component, for example the data may be room temperature values and the HVAC component may be a boiler 140. The temperature values may be values recorded during times when the boiler 140 is turned on. They may also include values recorded before the boiler 140 has been turned on and after the boiler has been turned off.

At step 204 the data collected in step 202 is analysed to identify patterns indicative of normal operation of the HVAC component, for example over a series of heating periods it may be possible to model normal operation of the house, such as a pattern showing how long it takes to increase the room temperature by a certain amount.

At step 206 the HVAC component is monitored by collecting data relevant to a first period of operation (or an activation period) of the HVAC component.

At step 208 the collected data is analysed. If the collected data diverges from a pattern indicative of normal operation by more than a certain amount an underperformance condition such as a suspected fault or failure of the HVAC component may be identified. For example, a control signal may have been sent to a boiler to instruct it to switch on to increase the room temperature, however the room temperature may not increase as per the usual pattern indicative of normal operation. In some embodiments, this analysis can be performed continuously as new data arrives, i.e. before the end of an activation period and before the complete set of data relevant to the activation period is complete. This means that a failure can be detected before the end of an activation period.

At step 210 the user is alerted of the suspected failure of the HVAC component. For example, this may be via a notification on a smartphone.

At step 212 a suggestion is given to the user that an appropriate test procedure of the HVAC component is initiated. The suggested test procedure may be appropriate to the suspected fault. This may again be via a notification on a user's smartphone.

If the user accepts or gives permission for the test procedure to go ahead, at step 214 a test procedure is initiated.

For example, the test procedure may override the user's heating schedule temporarily and the resulting room temperature may be recorded.

At step 216 the results of the test procedure are collected and analysed. If the test results confirm that the HVAC component has failed, at step 218 a message is sent to the user requesting permission to call out an engineer. Alternatively, if the test results show that a failure has not occurred, a message will be sent to the user informing them of this outcome.

In some cases the data collected at step 206 may be sufficient to determine, at step 208, the specific failure of the HVAC component, such that no testing is required. In such a case, the method 200 may proceed from step 210 straight to step 218.

In other cases, steps 202 and 204 may be omitted as it may be possible to identify a suspected fault from a single period of operation, without requiring knowledge of previous operational periods, e.g. by identifying inherent inconsistencies in the data (such as temperature decreasing despite heating being on).

The process 300 of collecting data relevant to a period of operation of an HVAC component will now be described in relation to FIG. 3. The process 300 may be performed at step 206 of FIG. 2.

At step 302 the value of an environmental characteristic is measured at regular time intervals. These time intervals may be predetermined and fixed, or may be configurable. For example, temperature sensor 112 and humidity sensor 114 may be arranged to record thermal and humidity data at 2 minute intervals.

At step 304 a log of the values of the environmental characteristic is maintained. The log may consist of values relating to only a recent time period, for example data collected in the preceding 30 minutes. However, 30 minutes is only an example, and the time period of data held in the log may be adapted, for example 20 minutes' or 40 minutes' worth of data may be used. As new values are measured, the oldest values will be deleted and overwritten. The time at which each value is measured will also be recorded.

At step 306 an indication that an HVAC component has or should have been activated (e.g. that the component is, or at least should be, in operation) is received. For example this could be a signal from the HVAC controller 120 indicating that it has just instructed the air conditioning system 144 to switch on. In one approach a copy of the "call for heat" control signals sent from the HVAC controller 120 to the boiler 140 (or of an equivalent control signal sent to another HVAC component) may be received and that control signal used to identify the start of an activation period. Alternatively the start of the activation period may be inferred from a change in target value (set point) configured in the control schedule and/or the fact that the measured environmental characteristic diverges from the target value by more than a certain amount. For example it may be that the recorded temperature is higher than the target temperature in the control schedule, so the air conditioning system should be activated. In some embodiments the target temperature is determined by locating the temperature at which the system starts to oscillate.

The indication that an HVAC component is (or should be) in operation triggers the creation of a record relating to an activation period of the HVAC component (step 308). The environmental characteristic values held in the log when the indication of activation is received are included in the record. The period of time for which the HVAC device is, or should be, switched on and operational is referred to herein as the "activation period" or "operational period" interchangeably.

In step 310 data indicative of the values of an environmental characteristic at predetermined time intervals continues to be recorded and this data is added to the record relating to the operational period of the HVAC component.

At step 312 an indication that an HVAC component has been deactivated (i.e. that the component has been, or at least should have been, switched off) is received. For example this could be a signal from the HVAC controller 120 indicating that it has just instructed the air conditioning system 134 to switch off (e.g. based on the "call for heat" or similar control signal as discussed above). Alternatively the end of the activation period may be inferred from a change in the control schedule set point and/or the fact that the recorded environmental characteristic (e.g. temperature) is within the acceptable range in the control schedule.

Following the end of activation of the HVAC component the sensor data corresponding to the environmental characteristic for a predetermined period continues to be added to the record relating to the activation period of the HVAC component (step 314). This subsequent time period may be equal in length to that of the values stored before the HVAC component was operational/activated, e.g. for a 30 minute time period following the de-activation of the component. However, the subsequent time period may be adapted. For example it may be at least 5 minutes or not more than an hour. Other suitable time periods would be around 20 minutes or around 40 minutes.

The resultant record of environmental characteristic values obtained from the sensors can be analysed to identify patterns and trends. This can be helpful in identifying "normal" behaviour and also in identifying a fault or error in the operation of an HVAC device or component, as described in more detail below.

Optionally, steps 302, 304 and/or 314 above may be omitted. Thus, in one example, environmental sensor data may be recorded only for the time period during which the HVAC component was actually intended to be in operation.

Figure 3:
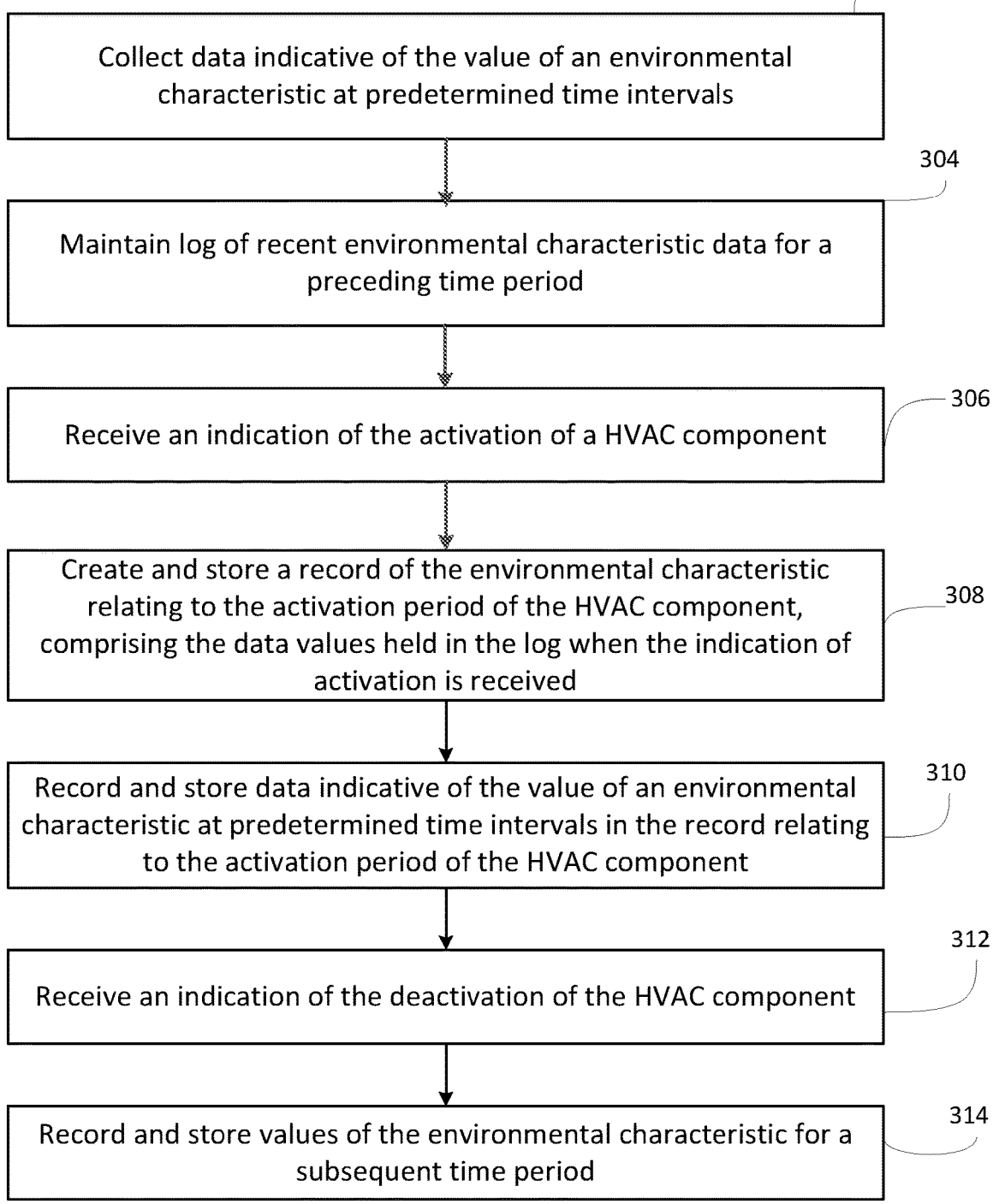
FIG. 3 is a flow diagram of an exemplary process for collecting data in an environmental control monitoring system.

In a preferred embodiment the methods 200 and 300 described in relation to FIGS. 2 and 3 are performed at the remote analysis server 180. For example in step 302 the environmental characteristic data can be measured by a sensor, sent to the HVAC monitoring device 110 as readings are generated, and then sent to the analysis server 180 (via access point 150 and the Internet 170). When the control and thermal data is received by the remote datacentre 180 it is placed on a message queue, and subsequently passed to an analysis module within the remote datacentre 180 for analysis.

The log can then be maintained at the remote datacentre 180 (step 304), which can construct and store the record (steps 308, 310 & 314) and perform the subsequent analysis. Indications of the activation and deactivation of the HVAC component (steps 306 & 312) may be sent from the HVAC controller 120 directly to the remote analysis server 180 via the Internet 170, or may be sent to the remote analysis server 180 from the HVAC monitoring device 110. Alternatively, the indication of (de-)activation may be inferred at the remote datacentre 180 based on knowledge of the pre-set environmental control schedule and the measured environmental characteristic data.

However, in alternative embodiments some or all of the steps of the methods 200 and 300 may be performed at the HVAC monitoring device 110 within the user's premises. In such a case the HVAC monitoring device 110 can have sufficient memory and processing power to perform the data collection and analysis itself, so that it is performed in the user's premises, which can be helpful if security or lack of communications (e.g. WAN) is a an issue. For example, at step 302 the temperature and humidity data can be sent to the HVAC monitoring device 110 for temporary storage. The log mentioned at step 304 may be stored at the HVAC monitoring device 110. Copies of the control signals described in step 306 may be sent from the HVAC controller 120 to the HVAC monitoring device 110 (steps 306 & 312). Alternatively, the indication of (de-) activation may be inferred at the HVAC monitoring device 110 based on knowledge of the pre-set environmental control schedule and the measured environmental characteristic data.

The HVAC monitoring device 110 may then create and store (step 308) the record of environmental characteristic data relating to the operational period. Alternatively, (where only some steps of the method 300 are performed at the HVAC monitoring device 110) upon receiving an indication of the activation of the HVAC component (step 306), the HVAC monitoring device 110 may send the data values stored in the log to the remote analysis module 180 so that the analysis module 180 can create and store the record relating to the operational period of the HVAC device (steps 308, 310 & 314).

The rolling log of values of the environmental characteristic may be stored at the remote datacentre 180 only or at both the remote datacentre 180 and at the HVAC monitoring device 110. In some embodiments the HVAC monitoring device 110 may pass the log onto the remote datacentre 180 as the data is measured and received (e.g. at 1-minute intervals), less frequently (every 30 minutes or so), only once the indication that an HVAC component has been activated is received at step 306, or only after detection of both the start and end of an activation period (step 312).

Similarly, the record relating to the activation period may be recorded only at the remote datacentre 180, at both the remote datacentre 180 and the HVAC monitoring device 110 simultaneously, or stored at the HVAC monitoring device as the record is being created and only sent to the remote datacentre 180 once the record is complete.

An activation period of an HVAC component can be detected from a binary message stream of control data, e.g. in the case of a boiler, a "boiler on" command followed by a consecutive "boiler off" command. This detection (performed at steps 306 and 312 above) may be performed at the remote datacentre 180 or at the HVAC monitoring device 110. If the control signal command is not available, the start of the activation period could be determined from the temperature rise itself, but in that case it may be more difficult to determine if the system had failed.

Figure 4:
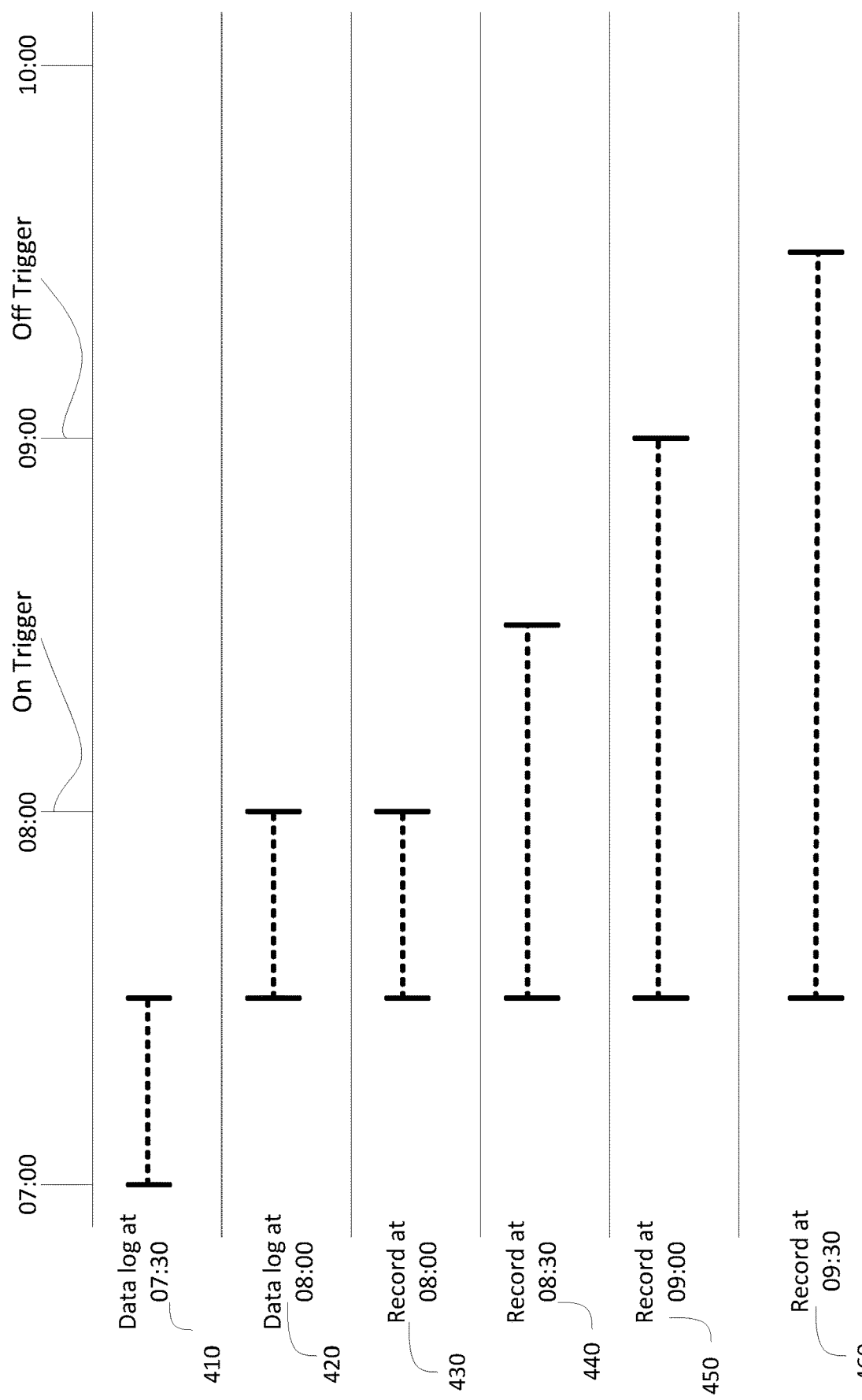
FIG. 4 is a timing chart showing an exemplary data collection process for the creation of a record relating to an operational period of an HVAC component.

FIG. 4 shows a chart 400 of the data collection process against a timeline, illustrating the creation of a record relating to the operational period of an HVAC component. The sensor(s) measure environmental data values periodically (e.g. every 1 minute, 2 minutes, every 5 minutes etc.) and these values are held in a log, with each value stored against the time at which it was measured. The log of values is maintained for a predetermined preceding time period, so that the log provides a rolling window of data. For example, the log may be stored in a circular buffer where, as each new value is recorded, the oldest value is overwritten. For example, the log may be a 30-minute window of data, with only the values measured from the last 30 minutes being held in the log at any one time.

Row 410 shows the data log of environmental characteristic values at 07:30 am. At 07:30 am the data log holds environmental characteristic values measured by the sensors in the last 30 minutes (i.e. the time period 07:00 to 07:30 am). Row 420 shows the data log of environmental characteristic values at 08:00 am. At 08:00 am the data log holds values from the last 30 minutes (i.e. the time period 07:30 to 08:00 am), however the values previously held in the log (e.g. those held at 07:30 am) have been deleted.

At 08:00 am a first trigger occurs indicating the start of an activation period; for example, a signal is sent to the HVAC component to switch it on. Therefore at 08:00 am a data record relating to the operational period of the HVAC component is created. The data record at 08:00 am is shown in row 430. At 08:00 am the record contains the values held in the data log (i.e. environmental characteristic data values collected from 07:30 to 08:00 am).

The sensors continue to measure environmental characteristic values periodically (in this case every 2 minutes). As these values are measured they are added to the data record for this operational period. Row 440 shows the data values held in the record at 08:30 am, which are the values measured between 07:30 am (30 minutes before the trigger) and 08:30 am (the current time).

At 09:00 am a second trigger occurs, indicating the end of the activation period; for example, a signal is sent to the HVAC component to switch it off. This means that this operational period of the HVAC device has come to an end. As can be seen from row 450, the data record at 09:00 am contains values measured between 07:30 am and 09:00 am.

The environmental characteristic values continue to be measured after the off trigger. The first 30 minutes' worth of data values (i.e. those between 09:00 and 09:30 am) are added to the data record relating to the operational period of the HVAC component. Row 460 shows the data held in the record at 09:30 am, i.e. all values recorded between 07:30 am (30 minutes before the on trigger) and 09:30 am (30 minutes after the off trigger). The record relating to the operational period of the HVAC device between 08:00 and 09:00 am is now complete and can be analysed.

Following the completion of the record relating to the operational period of the HVAC device the system reverts to logging the sensor data for a rolling 30-minute window, until the start of the next activation period.

The log and record described in relation to FIG. 4 may be stored in the HVAC monitoring device 110, in the remote datacentre 180, or in both. In some embodiments it may be advantageous to hold the data log in the HVAC monitoring device 110 only, and then transmit values to the remote datacentre 180 only once an on trigger has been received. In such an embodiment, the data record relating to the operational period of the HVAC component may then be created and stored at the remote datacentre 180 only, while the HVAC monitoring device 110 continues to store only the log of most recently collected environmental data values.

Figure 5:
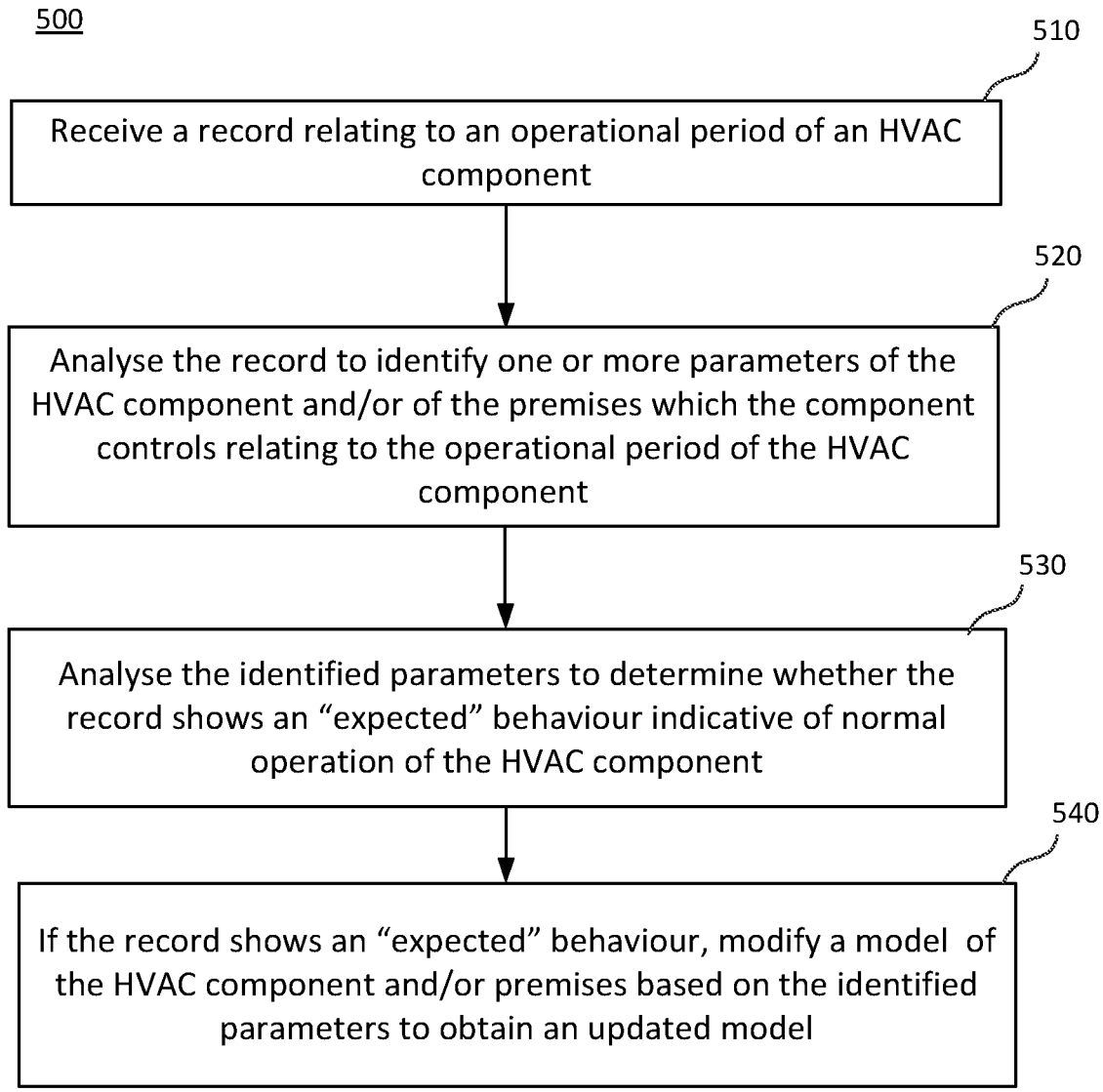
FIG. 5 is a flow diagram of an exemplary process for identifying "normal" system behaviour in an HVAC or environmental control monitoring system.

FIG. 5 shows a method 500 for monitoring "normal" behaviour of an HVAC component or device. Method 500 may be performed at step 204 of method 200 (FIG. 2).

At step 510 a record relating to an operational period of an HVAC component is received. As described above in relation to FIGS. 3 and 4, this record will normally include data relating to an environmental characteristic (e.g. temperature, humidity) measured while the HVAC component or device is in operation. The measurements of the environmental characteristic made in a period before and after the HVAC device is operating may also be included in the record. The HVAC device could be e.g. a boiler, or an air conditioning unit.

At step 520 the record is analysed to compute a set of parameters relating to the HVAC device (e.g. relating to its operation and/or performance) and/or relating to the premises which the HVAC device controls (e.g. relating to the environmental response of the monitored space), for that operational period. These parameters could for example include one or more of:

- Change in value of measured environmental characteristic over length of time for which the HVAC component is on (for example, rate of change of room temperature or other characteristic over activation period, such as rate at which the premises heats up when the boiler is on (e.g. measured in degrees change per hour));
- Amount of energy required to maintain the environmental characteristic at its target value, such as the heating required to maintain a given target temperature at the premises (e.g. the minutes per hour for which the boiler must be on);
- Maximum/minimum achievable internal characteristic (e.g. the maximum temperature is indicative of the steady state reached when boiler is fully on);
- Runtime characteristics of the specific system (e.g. periodic oscillations in the environmental characteristic, which correspond to the length of time an HVAC component (e.g. a boiler) will run continuously before shutting itself off for a period of time);
- Typical time an environmental characteristic will take to begin to change (e.g. temperature start increasing) after the start of an activation period;
- Length of time for which the HVAC component is switched on (or is operating);
- Rate of change of an environmental characteristic (e.g. room temperature) at or near the beginning of an operational period;
- Rate of change of an environmental characteristic (e.g. room temperature) at or near the end of an operational period;
- Summation of the rate of change over the whole set of characteristic (e.g. temperature) measurements, (e.g. a positive sum indicates warming);
- Integral of difference between measured characteristic (e.g. room temperature) and target setpoint (e.g. target temperature set according to heating schedule);
- Integral of difference between measured characteristic and averaged rate of change of characteristic;
- Time (as a proportion of the whole activation period) at which the minimum (or maximum) characteristic value (e.g. temperature) is measured;
- Standard deviation (or other variability measure) of the characteristic readings indicating the variability of the characteristic over the activation period; and
- Measures of the quality of the data being received, such as gaps in data or periods in which no change in the measured characteristic is detected.

Although the term "temperature" has been used in the examples above, the parameters could relate to other environmental characteristics that are measured, such as humidity.

Another example parameter that may be calculated is the Demand Degree Day (DDD), which is the number of degree days taken between the target temperature and the room temperature, i.e. the integral of the difference between the target temperature ($T_{target}$) and the measured room temperature ($T_{measured}$) over time (t). Time (t) may be the whole activation period, or a sub-sample (e.g. 5 minutes), to show the change over the activation period.

$$DDD = \int |(T_{target} - T_{measured})| dt$$

The trend of the DDD value shows whether a system is performing correctly to reach or not. It also helps indicate the user's preference, i.e. if they change the target target setpoint mid operation. The higher the DDD the more the schedule is unfulfilled, indicating an underperforming system. Similarly, the rate of change of the DDD over an activation period will show, in the case of normal heating operation, a reducing value as target temperature is reached. However, if the DDD rate increases then this is indicative of a failing system (see e.g. FIG. 8 below).

In some embodiments the computed parameter(s) are context-dependent and are mapped to one or more secondary characteristics, such as external temperature. For example, for any of the above parameters, a different instance of the parameter may be calculated from the operational periods for which the secondary characteristic has particular values or lies within particular ranges. As an example, one instance of the parameter may be calculated for operational periods when the external temperature is 10-15° C., another parameter instance may be calculated when the external temperature is 15-20° C. and yet another for periods when the external temperature is 20-25° C. Alternatively, the secondary characteristic could be the time of year (e.g. due to winter being indicative of colder weather than summer).

In some embodiments, the identification of the parameters can be performed continuously as new data arrives, i.e. before the end of an activation period and before the record relating to the operational/activation period is complete. This means that it may be possible to detect a failure before the end of an activation period.

At step 530 the identified parameters are analysed to decide whether the record is indicative of an "expected" or normal behaviour of the HVAC device. The identified parameters may be compared to trends expected from the operation of that type of HVAC component in general.

Large divergence from an expected trend or inherent inconsistencies in the data may indicate the behaviour is not "expected" or "normal". For example, if the device is a boiler which has been switched on in order to increase the room temperature, the measured room temperature would be expected to increase over the time of the record (or at least while the boiler is on; the room temperature may decrease after the boiler is switched off). If the measured room temperature decreases during the heating period, even some time after the boiler has been switched on, the behaviour is unexpected and further investigation may be required. As another example, heating periods in which the recorded room temperatures are similar at the start and end of the heating period are indicative of a "steady state" mode. This means either (1) heating has reached the target temperature or (2) the house/premises has reached saturation. Scenario (1) is correct operation and "expected" behaviour. Scenario (2) indicates, if the recorded temperature is below the target temperature, that the system may be underperforming; this is not "expected" behaviour. Saturation temperature can be affected by external temperature. For example, in some houses it might be possible to achieve a temperature of 22 degrees Celsius when it is 14 degrees Celsius outside, but only 20 degrees Celsius when it is freezing outside. Thus knowledge of house performance can be useful to help determine whether a failure has occurred.

A variety of analytical techniques may be employed to determine whether the calculated parameters conform to "expected" behaviour or are indicative of potential faults or underperformance. Preferred embodiments employ machine learning techniques to derive a classification model for classifying the system behaviour, as specified by the calculated parameter set. The classification model may be a binary model allowing classification into "expected" and "abnormal" classifications, with further analysis performed on activation periods classified as "abnormal" to determine the probable nature of the fault or other underperformance condition, as discussed further below. Alternatively the classification model could provide more than two classifications (e.g. including multiple broad failure classifications in addition to an "expected" classification). Broadly speaking, such a machine learning approach may use parameter sets calculated for past activation periods (from the specific property under consideration or from multiple properties) and for which the relevant classification is known (either through automated analysis or labelling by an operator) as training samples to train the classification model.

In a preferred embodiment, a regression technique such as logistic regression may be used to combine two or more of the parameters determined at step 520 to better classify system behaviours and identify faulty behaviour. In an example of such an approach, the set of parameters used defines a multidimensional feature space, and the regression algorithm computes a decision surface separating labelled training samples into the "expected" and "abnormal" classifications. Future samples are then classified based on the learnt decision surface.

Other information such as weather information (e.g. an outside temperature measurement and/or predicted weather forecast data from an external data source) may be used as an additional input, allowing a seasonal model to be applied—e.g. in colder months a house may be expected to cool more quickly at the start of an activation period, before heat transfer from the heating system is fully functional. Seasonal knowledge can allow such a drop to not be confused as a failure. However, if there is a boiler failure, then even quicker cooling than usual for the season may be expected.

In order to determine whether the record shows an "expected" behaviour it may be necessary to provide additional data, for example, the control command given to the HVAC device and the reason for the control command (e.g. turn boiler on because the room temperature is below target). In order to make this determination the HVAC monitoring device 110 and/or the remote datacentre 180 preferably receives the control schedule that has been set for the HVAC system.

Where the parameters are calculated before the end of an activation/operational period and before the record relating to the operational/activation period is complete (e.g. continuously as new data arrives), this analysis may also be performed before the end of the operational period. This means that it may be possible to detect a failure before the end of an activation period.

If it is decided at step 530 (e.g. based on applying the classification model to the computed parameter set) that the record shows an "expected" behaviour, the method proceeds to step 540. If it is decided the record does not show expected behaviour a different process is followed (beginning at step 640 of FIG. 6).

At step 540 a standardised model of the behaviour of the HVAC component and/or premises is adjusted or modified. For example, this may involve adjusting the learnt classifier based on the parameter set calculated for the currently analysed activation period, e.g. by adding the calculated parameter set as a further labelled sample of expected behaviour to the set of training samples and retraining the classification model (review and confirmation by a human operator may be required before updating the model).

When a system is first installed, a "global model" of normal operational periods may be used initially. This may be in the form of a default classifier based on a set of training samples for other HVAC installations/properties. Subsequently the classification model is then refined based on the parameter data collected for the new system. Over time, the model is therefore adapted to fit the particular premises and HVAC installation more accurately.

The data from these normal operation periods can be sampled for accuracy. The normal operation periods can then be used in other analysis to monitor whether the system is operating correctly, as described in more detail below.

It is possible to use the normal heating periods to check the expected thermal characteristics of the environment. For example, the boiler run time can be predicted based on outside/inside temperatures and a thermal model. This prediction can then be compared to the actual measured run time to see if the system performs as expected or takes longer. If the HVAC system is coming on at unexpected times this can also be seen.

Figure 6:
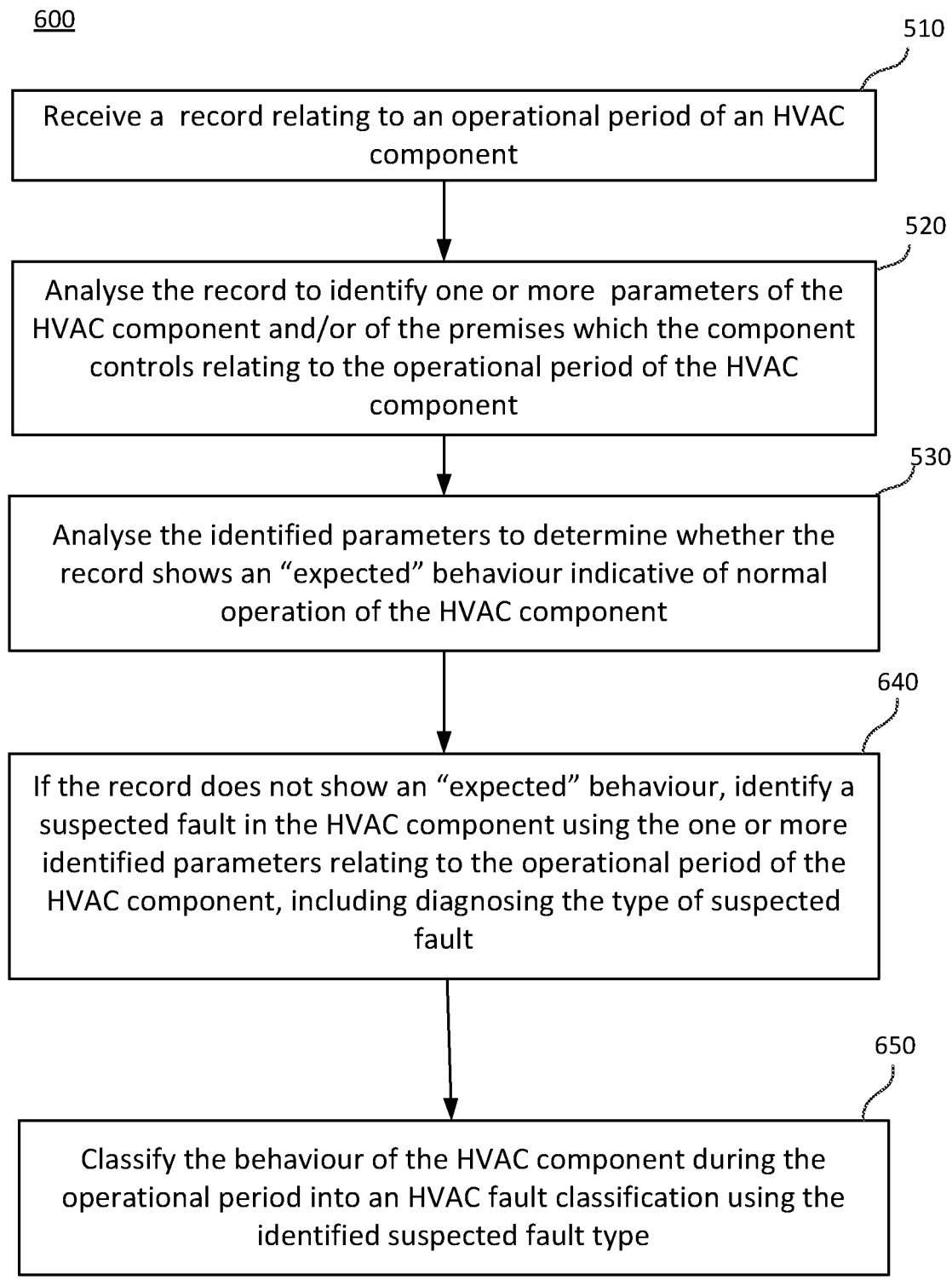
FIG. 6 is a flow diagram of an exemplary process for identifying faults in an HVAC monitoring system.

FIG. 6 shows a method 600 for identifying a fault or failure in an HVAC component. Method 600 may be performed at step 208 of method 200 (FIG. 2) to analyse data relevant to an operational period of an HVAC component to identify a suspected fault. The first three steps 510, 520, 530 of method 600 are the same as in the method 500 of FIG. 5; a record relating to an operational period of an HVAC component is received, one or more parameters are determined from the record and then the one or more parameters are analysed to decide whether it is indicative of an "expected" response of the monitored environmental characteristic that would be seen with normal, non-faulty operation of the HVAC device (thus, the calculated parameters are preferably the same set as determined in step 520 of FIG. 5). Examples of records identified as showing unexpected behaviour include, for example, situations where there is a drop in room temperature over a heating period (e.g. a period during which the boiler has been instructed to provide hot water for the heating system), a rise in room temperature over a cooling period (e.g. while an air conditioning unit is switched on), and a rise in room temperature during a hot water heating period (but whilst the central heating is switched off).

The determination that the record does not conform to "expected" behaviour may be made based on the same classification model as discussed above. Thus, classification is performed as discussed above (by applying a learnt classification model, e.g. by comparing the parameter set for the current activation period to a decision surface in an n-dimensional decision space), but in this case yields an "abnormal behaviour" classification.

If the record does not indicate "expected" behaviour then the heating period is identified as a potential failure of the HVAC system for further investigation. Therefore the method progresses to step 640 in which the one or more parameters relating to the activation period of the HVAC component are analysed further to identify what the suspected fault may be.

The one or more parameters can include, for example, one or more of those mentioned at step 530 above.

At step 640 the existence of a suspected fault in the HVAC system is identified. This can include identifying the type of fault (i.e. diagnosis of the specific issue with the HVAC component). In some cases it may not be identifiable from the data, so there may be an "unidentified" fault type diagnosed.

At step 650 the parameters identified at step 530 and any identification of the fault made at step 640 are used to assign the behaviour of the operational period a failure classification. For example, the classifications may be "critical" and "non-critical" failures. There could (also) be a category for unconfirmed failures which require further investigation or testing in order to identify the specific failure. Classified failures can then be dealt with in different ways depending on the failure classification assigned.

As in the FIG. 5 case where the activation period is classified as conforming to "expected" behaviour, in the FIG. 6 case where abnormal behaviour is identified, the set of parameters may be fed back as a training sample to allow the classification model to be refined. This may be done automatically, or after confirmation by a human operator (which may serve to prevent propagation of classification errors).

As mentioned in relation to the methods 200, 300 of FIGS. 2 and 3, the processes 500, 600 of FIGS. 5 and 6 may be conducted at the HVAC monitoring device 110 or at the remote datacentre 180. For example, the remote datacentre 180 may include an analysis module at which methods 500, 600 are performed. In some embodiments the methods 500, 600 may be performed at both the HVAC monitoring device 110 and at the remote datacentre 180, or some steps may be performed at one whilst other steps are performed at the other. In a preferred embodiment the methods 500, 600 for analysing normal and faulty behaviour of an HVAC component are performed at the remote analysis server 180.

If the analysis at steps 520 and/or 530 is performed at the remote datacentre 180, information and records from other HVAC components and other premises may be used in order to determine whether the behaviour is as expected.

Figure 7:
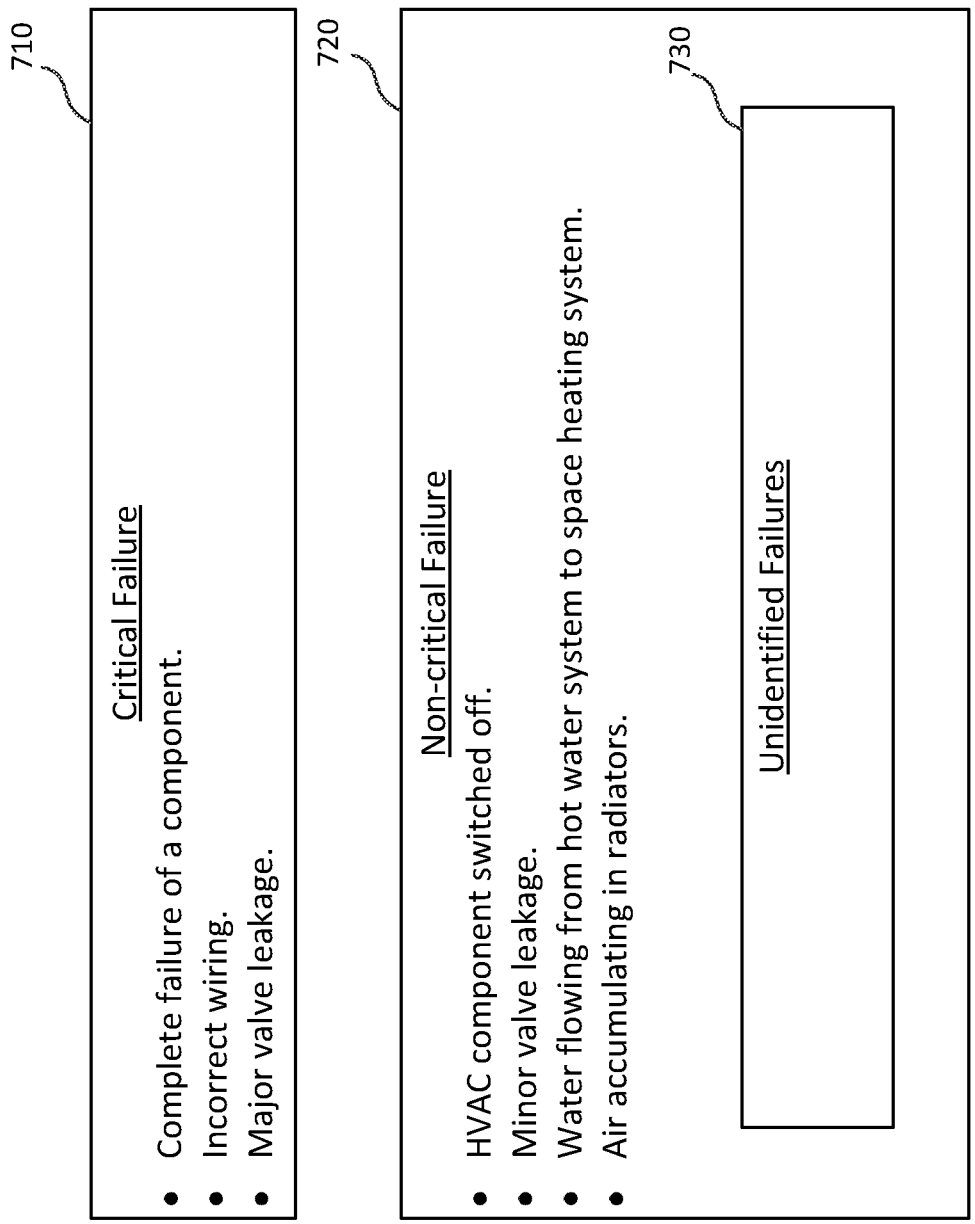
FIG. 7 is a diagram showing an exemplary classification of different fault types in an HVAC or environmental control system.

Specific fault types that can be identified at step 640 may include, for example: incorrect wiring, valve leakage and heat leaking from hot water system to space heating system. FIG. 7 shows an example of possible failure classifications that may be made at step 650 once a specific failure type has been identified. The classifications include critical failures 710, non-critical failures 720 and failures which are unidentified or require further investigation 730. In this case the non-critical failures category 720 includes the unidentified faults 730 (i.e. classification 730 is a subset of classification 720). However in some embodiments the unidentified failure classification 730 may be a separate classification.

Critical failures 710 may include: complete failure of a component; incorrect wiring (inverse/swapped control); or extensive valve leakage. These may cause damage to the premises, or result in a system which does not function at all.

Non-critical problems 720 which can be identified by the HVAC monitoring system include: air accumulating in radiators; valve degradation; boiler/HVAC component switched off and water flowing from Hot Water (HW) system to Space heating (SH) system. These problems with an HVAC system would not cause an instant "failure", however they may cause degradation or under performance over time, which would show up as gradual changes in the way the thermal environment behaves.

Unidentified faults 730 may, for example, relate to operational periods of the HVAC component in which the parameters diverge from the standardised normal parameters for the HVAC component and/or premises, but which do not seem to have the characteristics of any specific known fault. Running a test cycle may give further details of the failure condition.

Specific examples relating to the identification of HVAC faults are described in detail below in relation to FIGS. 8 to 11.

Figure 8:
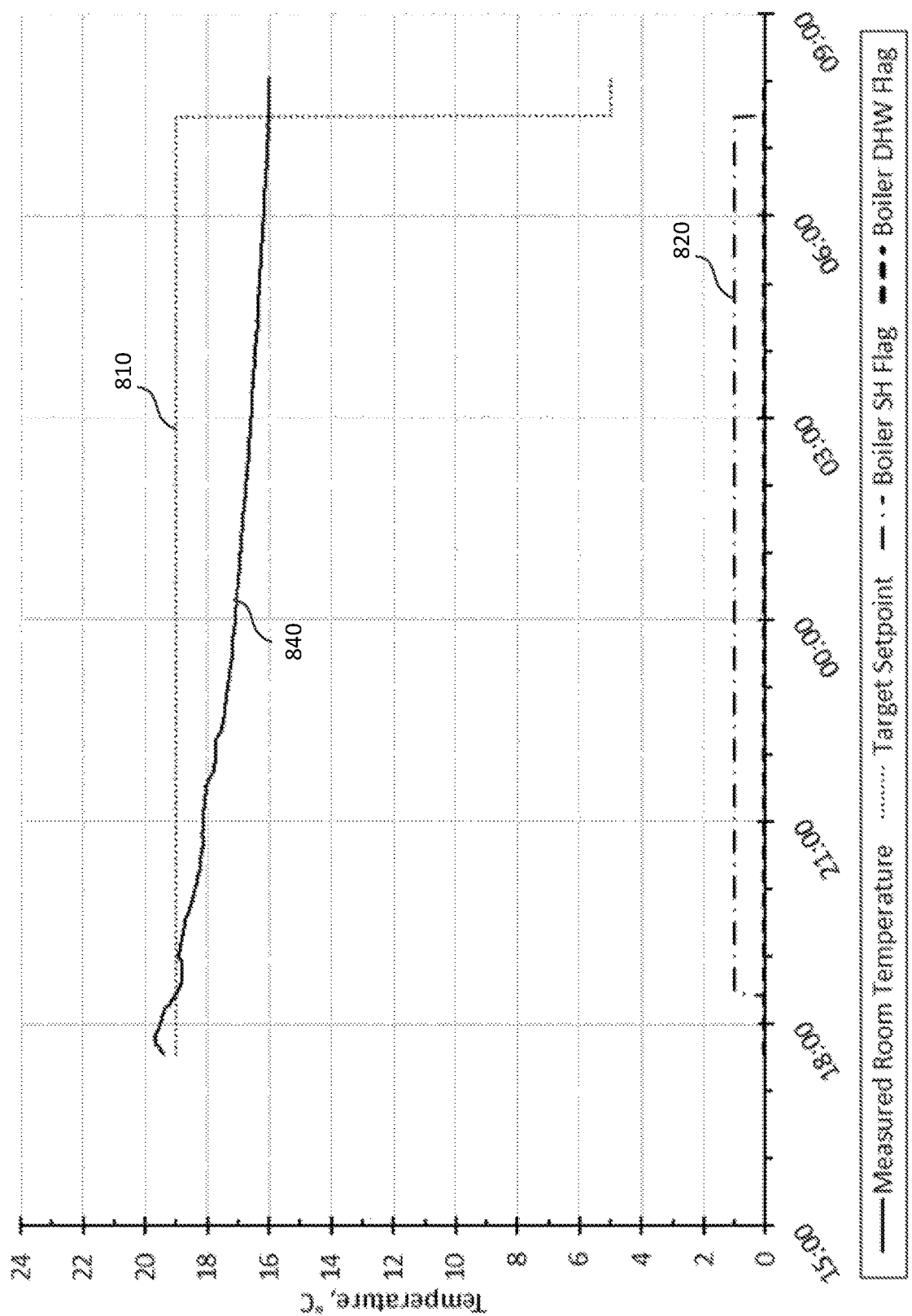
FIG. 8 is a plot showing an exemplary temperature data set indicative of a complete boiler failure.

FIG. 8 is a plot showing a temperature data set indicative of a typical "catastrophic"—i.e. complete—boiler failure. Line 810 shows the target room temperature setpoint; line 820 shows the boiler call for space heating (this is binary 1/0, i.e. on or off); line 840 shows the internal room temperature.

The target temperature 810 has been set to 19° C. from the start of the data set (at 17:30) until 07:30 the next day. The measured room temperature 840 at 17:30 is between 19° C. and 20° C. (i.e. above the target temperature).

At around 18:30 the recorded room temperature 840 drops below 19° C., which triggers a Boiler On command as space heating (SH) is requested by the HVAC controller in order to maintain the target temperature 810 (e.g. by placing a call for SH control signal 820 in an "on" state). As is shown in FIG. 8, the logged thermal data from the preceding time window is stored in the data object for this new heating period and any new temperature data points are appended to the data object in real time. In this case 60 minutes' worth of data preceding the activation period is shown, beginning at around 17:30. However in some cases only 30 minutes' worth of data preceding the activation period will actually be added to the data record. The thermal data can be updated in real time (e.g. every 2 minutes, as the temperature sensor records the thermal data).

The boiler was commanded to provide SH, but the room temperature 840 continues to fall to around 16° C. between 18:30 and 07:30 the next morning. This is because the boiler is no longer generating hot water. An alert would be sent to the user indicating this and asking if they had manually turned off their boiler.

At 07:30 the pre-programmed target temperature 810 changes from 19° C. to only 5° C. (this may be because the user does not require heating to be on during the day). This triggers a "Boiler Off" command (e.g. by placing the call for SH control signal 820 in an "off" state) and, the following 30 minutes of temperature (or thermal) data is logged and appended to the data object or record relating to the operational period of the boiler.

Figure 9:
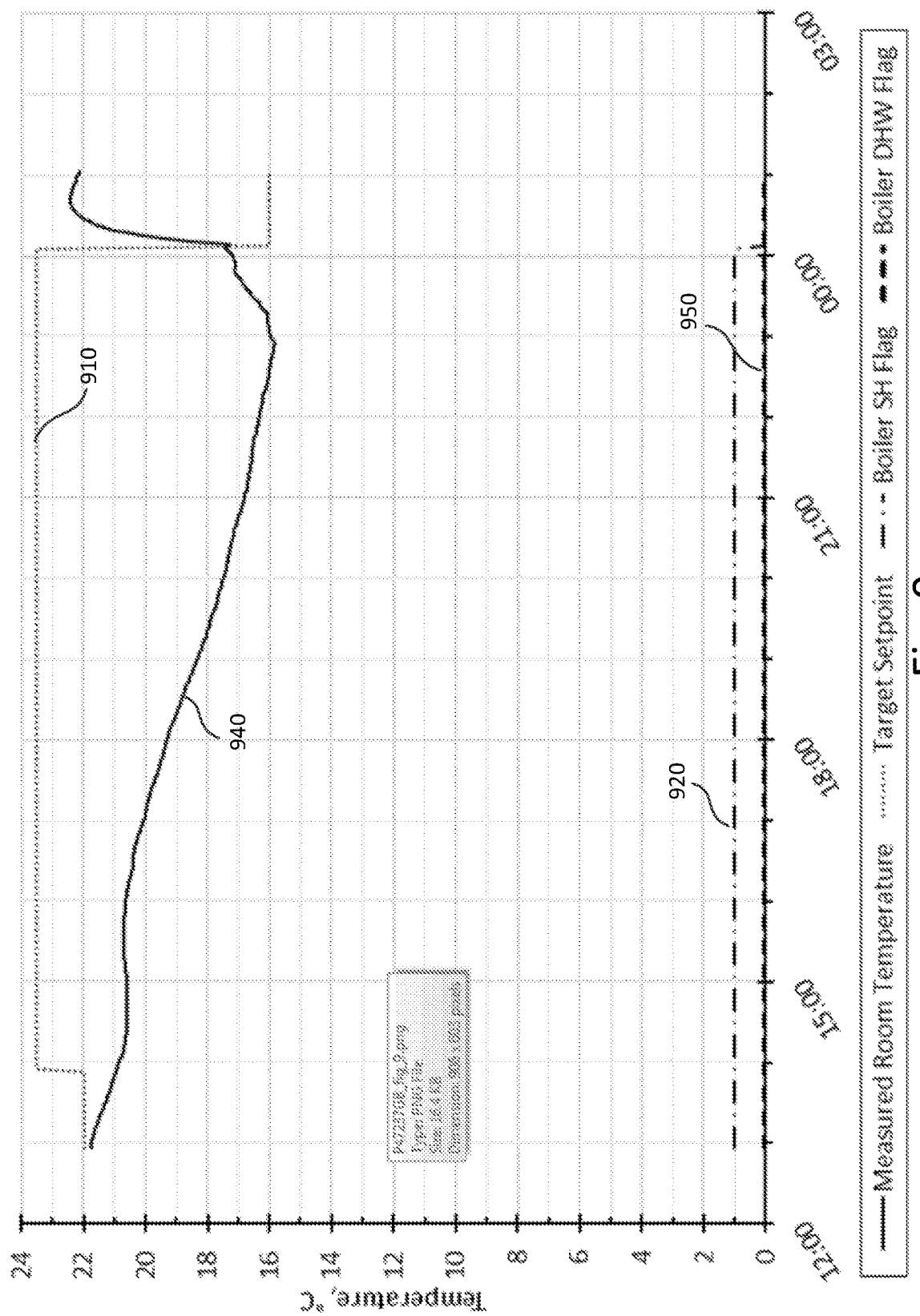
FIG. 9 is a plot showing an exemplary temperature data set indicative of inverted wiring.

FIG. 9 shows the case where the boiler wiring has been inverted at installation. Line 910 shows the target room temperature setpoint; line 920 shows the boiler call for space heating (this is binary, i.e. on or off); line 940 shows the internal room temperature; and line 950 shows the boiler command for DHW did not occur (zero throughout).

The target temperature 910 at the beginning of the data object (13:00) is 22° C. and the recorded temperature is just below this so the boiler call for space heating (SH) 920 is on, but the measured room temperature 910 is decreasing.

Just before 14:00 the target temperature 910 is increased to 23.5° C. and the boiler call for SH 920 remains on. The recorded room temperature 940 continues to reduce to around 21° C., where it levels out for around 2 hours, and then gradually decreases again due to the cooling external temperatures in the evening. The temperature 940 continues to decrease to a low of 16° C. at around 23:00, and then gradually begins to increase again to around 17° C. at midnight.

Just after midnight the target temperature 910 is reduced to 16° C. As the measured room temperature 940 exceeds the target temperature this triggers deactivation of the call for SH signal 920 to the boiler. The measured room temperature 940 suddenly rapidly rises from 17° C. to around 22.5° C. between 00:00 and 00:30. After around 00:30 the measured room temperature begins to fall again.

In this example, a temperature decrease is thus observed during a call for heat and a temperature increase after at the end of the heating period. As the boiler command seems to be inverse to the temperature gradient in the house this indicates that the boiler wiring seems to be inverted, i.e. an installation error.

Figure 10:
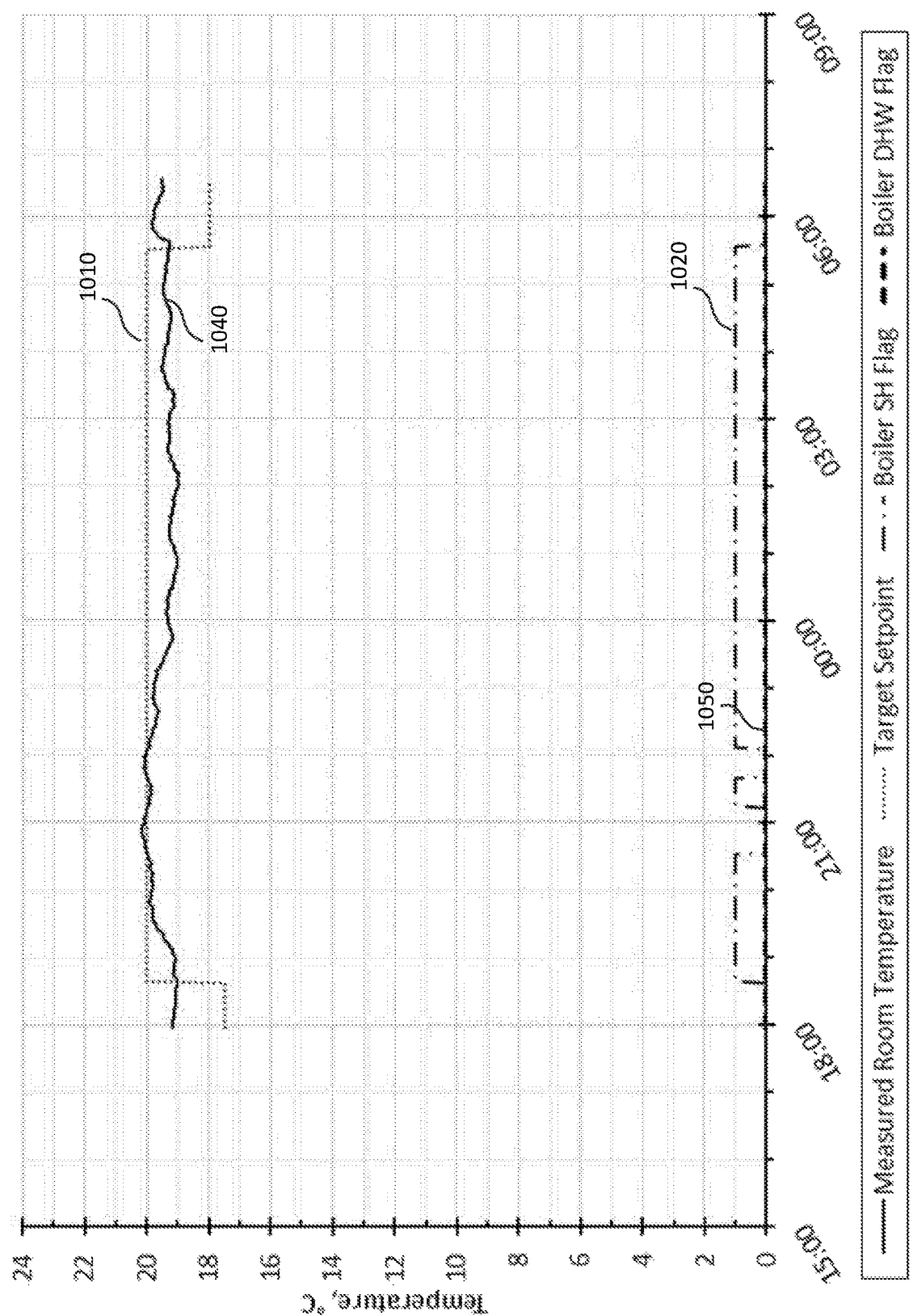
FIG. 10 is a plot showing an exemplary temperature data set for an underpowered or incorrectly balanced environmental control system.

FIG. 10 is a graph showing temperature for an underpowered or incorrectly balanced system. Line 1010 shows the target room temperature setpoint; line 1020 shows the boiler call for space heating (this is binary, i.e. on or off); line 1040 shows the internal room temperature; and line 1050 shows the boiler call for Domestic Hot Water (which is off, zero, throughout).

The room temperature 1040 at the beginning of the dataset (18:00) is around 19° C. and the target temperature 1010 is 17.5° C., so the boiler SH is switched off (line 1050 is at zero). At 18:45 the target room temperature setpoint 1010 increased to 20° C., which triggers the boiler SH on signal 1020. The measured room temperature 1040 gradually increases and reaches 20° C. at 20:30, so the boiler is switched off.

The measured room temperature 1040 just after 21:00 is slightly above the target temperature 1010 of 20° C. so the boiler is off and SH is not being called. The measured temperature 1040 then drops slightly below 20° C., which activates the call for SH signal 1020 and the measured temperature 1040 rises to above 20° C. at around 21:30. The call for SH signal 1020 is then deactivated.

The measured room temperature 1040 then gradually begins to fall to below 20° C. just after 22:00, which turns the call for SH 1020 on. The measured room temperature 1040 continues generally to drop over the next 8 or so hours and does not reach the target temperature 1010 of 20° C. There are slight oscillations in the measured room temperature 1040 during this time of around 0.5° C. with a period of about 1 hour. This is because over night the external temperature increases the cooling rate of the property above the rate at which the boiler can produce heat, causing the room temperature 1040 to lower gradually with an oscillation period related to the boiler firing maximum runtime (in this case ~30 minutes). This shows that the system is underpowered or incorrectly balanced.

At around 05:30 the target temperature is reduced to 18° C. Since the measured room temperature 1040 is above 18° C., the call for SH 1020 is switched off and the following 60 minutes of temperature (or thermal) data is logged and appended to the data record for the activation period.

Figure 11:
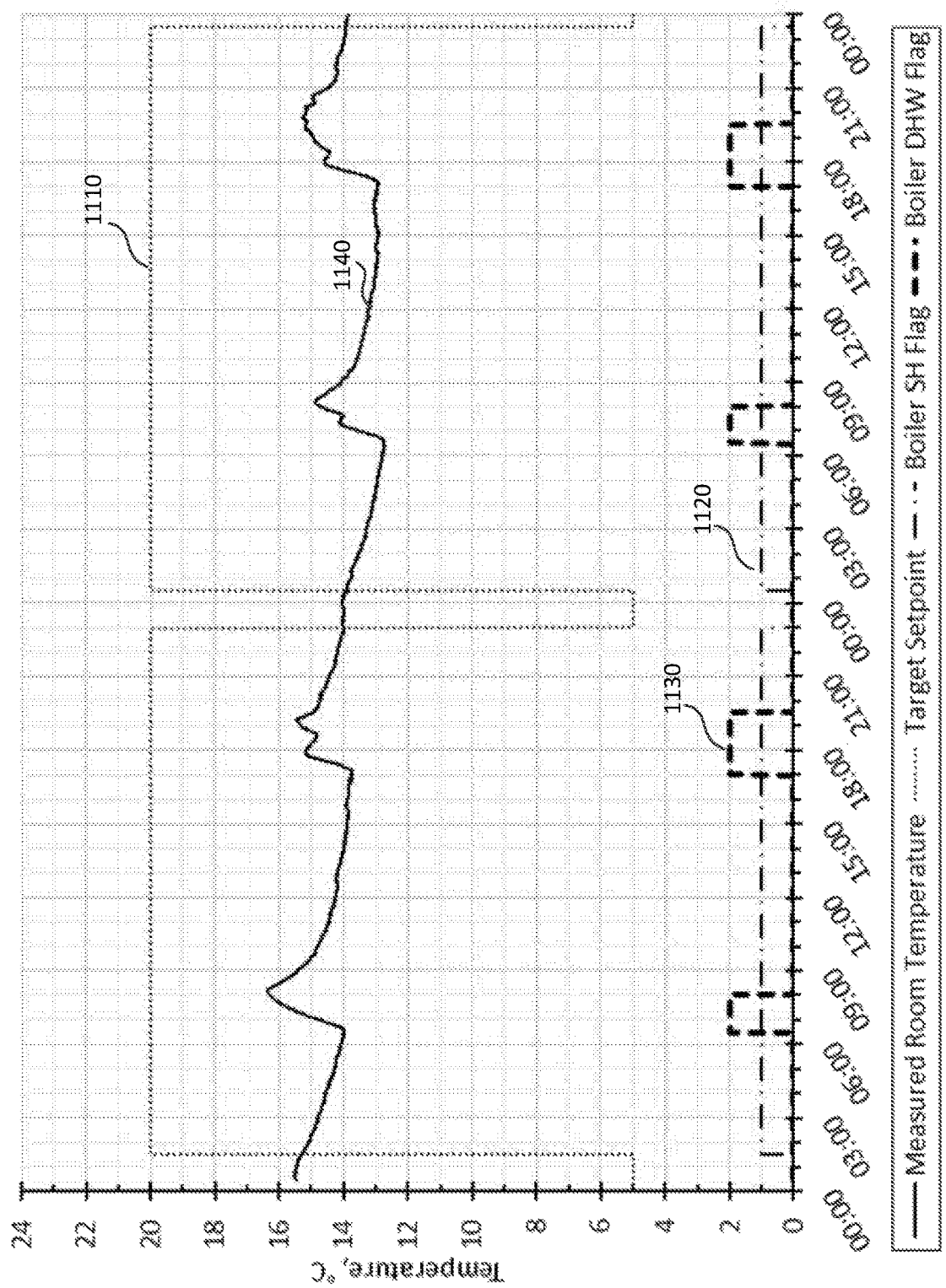
FIG. 11 is a plot showing an exemplary temperature data set for an environmental control system in which the room temperature is affected by calls for Domestic Hot Water.

FIG. 11 shows temperature data for a system in which the room temperature is affected by calls for Domestic Hot Water (DHW). Line 1110 shows the target room temperature setpoint; line 1120 shows the boiler call for space heating (this is binary, i.e. on or off); line 1130 shows the call for DHW (also binary encoded); line 1140 shows the internal room temperature.

The target room temperature 1110 rises from 5° C. to 20° C. at 01:30, above the measured room temperature 1140 of ~15° C., which continues to drop. This triggers the boiler call for SH 1120. The following evening the target setpoint schedule drops to 5° C. between 23:00 and 00:30, temporarily stopping the call for SH, but no effect is seen on the room temperature data 1140. In spite of the fact that the call for SH is on almost continuously, the measured room temperature 1140 stays between about 13° C. and 16° C. and does not get anywhere near the target setpoint of 20° C. This shows that there may be a boiler fault, or the SH capacity of the boiler may have been manually switched off. It is noted that in such cases it may not be possible for the system to distinguish between a boiler that has been manually switched off and a boiler that has completely failed.

At around 06:30 the call for DHW 1130 signal is activated for 1.5 hours. In this case faulty valves in the water and heating system may have caused hot water from the domestic hot water supply to leak into the space heating system for the radiators. Therefore shortly after the DHW call 1130, the measured room temperature 1140 rises rapidly from 14° C. to ~16.5° C. as the temperature of the water in the radiators has increased. When the DHW call 1130 ends at around 08:00 the recorded room temperature 1140 begins to drop again to below 15° C.

The call for DHW signal 1130 is also activated between 17:00 and 19:30, again causing a sharp rise in the measured room temperature 1140 during those hours, followed by a subsequent fall.

This pattern of temperature rises during DHW call is also shown to be repeated the following day with a steady gradual descent in temperature.

This shows the room temperature is very low and is correlated with (and hence probably affected by) the calls for DHW, rather than by the SH command (which is mostly on, apart from when the target room temperature is at 5° C.). This indicates a system with leaks between the DHW system and the SH system, so that room temperature rises come from the domestic hot water signal causing the water in the radiators to heat up and hence heat the room.

In an alternative situation, if it is observed that the room temperature is affected by calls for hot water, this may be due to faulty wiring. For example, it may be the case that the call for DHW signal is wired to the SH inputs, so the thermostat may send a signal to activate water heating but instead the space heating will be activated. In this situation there would likely be a significant increase in room temperature when the DHW is called.

Another scenario that could be detected would be the call for domestic hot water affecting the room temperature because heat from the hot water tank and/or pipes leaks into the room. Operating the boiler to heat water would result in a small amount of heat leaking into the room, from the boiler/pipes/or the tank itself, thus the room temperature would increase slightly. This could occur during normal (correct) hot water operation (possibly indicating inadequate insulation).

The system shown in FIG. 11 has a greater DDD than that in FIG. 10. This indicates that the system of FIG. 11 is underperforming more badly than the system of FIG. 10, which is almost at the target setpoint.

Whilst FIGS. 8-11 illustrate some examples of failures that may be detected and classified by analysis of temperature data sets in accordance with the described techniques, these examples are not exhaustive.

Figure 11B:
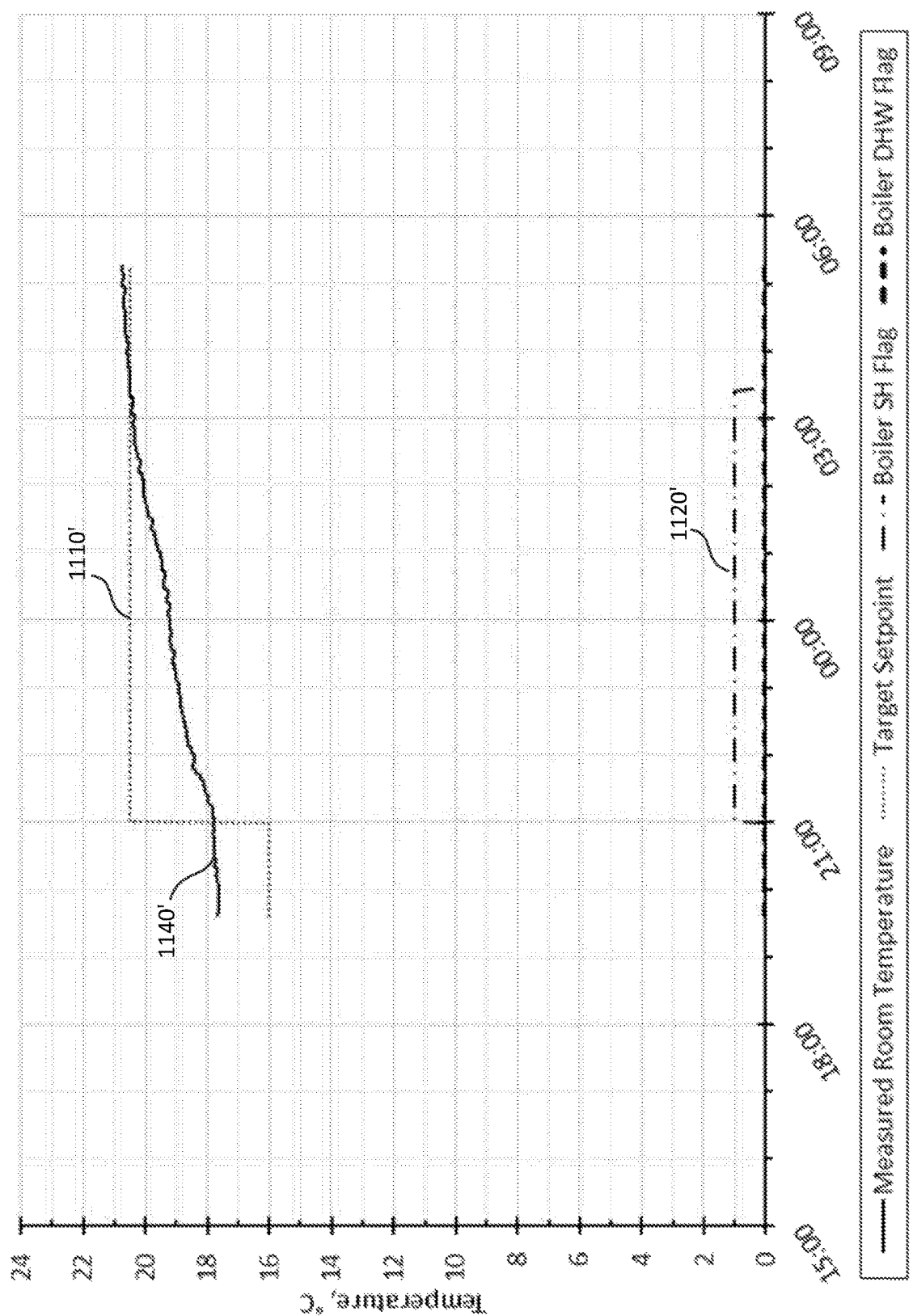
FIG. 11B is a plot showing an exemplary temperature data set for a heating system that is operating normally.

FIG. 11B shows an example of temperature data for a heating system that is operating normally. Line 1110' shows the target room temperature setpoint; line 1120' shows the boiler call for space heating (this is binary, i.e. on or off); line 1140' shows the internal room temperature.

Initially the room temperature 1140' is around 18° C. and the target setpoint 1110' is 16° C., so the boiler call for space heating is switched off. At 21:00 the target setpoint 1110' increases to 20.5° C. This causes the boiler call for space heating 1120' to switch on. The measured room temperature 1140' steadily rises between 21:00 and 03:30, at which point it reaches the target temperature of 20.5° C. This causes the boiler call for space heating 1120' to switch off. This shows a rise in room temperature of around 2.5° C. in around 6.5 hours (i.e. a rate of 0.4° C. per hour). This may be used to build up a thermal model of the premises and/or modify a standard global model, which can be used in future determinations of faults.

Once detected and classified, classified failures can be labelled and placed on failure-specific message queues at the datacentre.

Failures, once suspected or identified, can be dealt with appropriately. For example:
- Catastrophic failures trigger alerts to the user quickly. These may be messages sent directly to the user's mobile device, email address etc. If the user is also signed up to a repair service, the service engineers can be alerted at the request (or pre-request) of the home owner.
- Houses with a heating system that is unable to maintain an adequate target temperature can be monitored for continued failure (e.g. to rule out manual ventilation etc.)
- A user can be messaged when certain criteria are surpassed (e.g. the notification criteria may indicate that a failure must be sustained for some minimum time duration and/or a certain number of failures must be recorded, e.g. the failure must reoccur over a given number of days).

Figure 12:
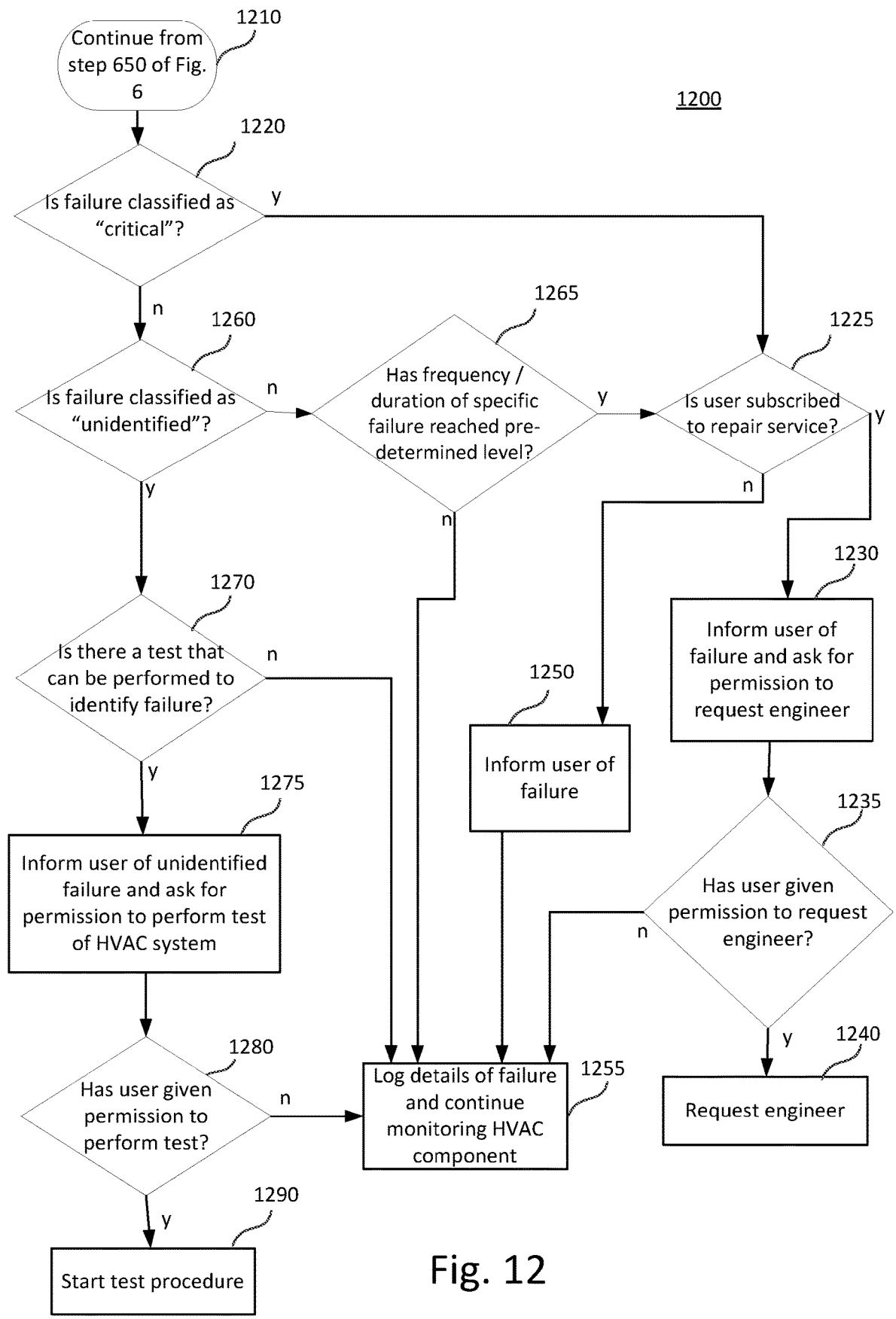
FIG. 12 is a flow diagram showing an exemplary process for informing the user of a fault that has been identified in an environmental control system.

FIG. 12 shows a flow chart 1200 of a process for informing the user of a failure or fault in the HVAC system once it has been identified. Process 1200 starts at step 1210 which continues on from the end of FIG. 6 after the behaviour of the HVAC component has been classified in step 650. At 1220 a determination is made as to whether the identified failure has been classified as critical. If the failure is classified as critical the process continues to 1225.

At 1225 a determination is made as to whether the user is subscribed to a repair service. If the user is subscribed to a repair service the process continues to step 1230.

At step 1230 the system informs the user of the critical failure and requests permission to request an engineer. This may be performed by sending a message to the user's phone, tablet or other electronic device such as user device 190 (see FIG. 1). Alternatively, the message may be displayed on a user interface within the home, such as user device 192 (see FIG. 1). The message may also ask the user if they have e.g. switched the HVAC component off manually, which could result in a data record that looks like a complete failure.

At 1235 a determination is made as to whether the user has given permission to request an engineer. If permission has been given, an engineer will be requested at step 1240. Details of the failure may also be sent to the engineer. For example data from the record relating to the operational period of the HVAC component may be sent to the engineer. In addition, standardised normal parameters of the HVAC component and/or records showing expected behaviour may also be sent to the engineer. This may allow the engineer to have prior knowledge of the system's mode of failure and the engineer may be able to fix the component more efficiently.

If the user did not give permission for the system to request an engineer at 1235 then details of the failure are recorded at step 1255 and the system continues to monitor the HVAC component. If the critical failure that has been identified as dangerous or likely to cause damage to a premises, an instruction may also be sent to switch the HVAC component off.

If at step 1225 it was determined that the user is not subscribed to a repair service, the user is simply informed of the critical failure of the HVAC component at step 1250. As in step 1230, the user may be informed of the failure via a message to their smart device, such as a mobile phone, and/or by a message displayed on a user interface at the premises.

Once the user has been informed of a failure of the HVAC component at step 1250, the process continues to step 1255 where details of the failure are logged and monitoring of the HVAC component continues. However, once again if the failure is determined as dangerous or likely to cause damage the HVAC component may be disabled.

If it is determined at step 1220 that the failure is not classified as critical the method continues to step 1260. This means the fault will be a non-critical fault and that it is not confirmed that the failure type will cause an instant, complete failure of the system or HVAC component. Non-critical faults may cause degradation or underperformance over time. Examples of non-critical failures include air accumulating in radiators and valve degradation. At 1260 it is determined whether the failure is classified as "unidentified". This would mean that the specific fault type of the HVAC component cannot be identified or confirmed based on the record relating to the operational period of the HVAC component.

If the failure is determined not to have been unidentified at step 1260, the process continues to step 1265, where a determination is made as to whether the non-critical but identified fault has occurred with a predetermined frequency, more than a predetermined number of times or for more than a predetermined length of time continuously. The predetermined level for the frequency of failures recorded, number of failures recorded or duration of the failure may be fixed or user configurable. If this predetermined level has been reached the method continues to step 1225 where it is determined whether the user is subscribed to a repair service. The process then continues as described above. If the failure has not reached the predetermined level details of the failure are recorded and monitoring of the HVAC component continues at step 1255, also as described above.

On initial installation, the monitoring system has no prior knowledge of the HVAC system installed, or of the premises. In one embodiment the system can learn about "good" operating conditions based on a number of successful activation periods. Metrics can be built on this monitoring to better refine the parameters by which future activation periods are deemed success or failure. For example some houses take 4+ hours to start warming up after the boiler is switched on. This might look like a failure for 4 hours, but if this system is known to be very slow then the monitoring can learn to expect that. Feedback from a user/operator can also be used to inform the monitoring system that what might look like a failure is not a failure.

Step 1255 may, for example, comprise adding the Demand Degree Day, DDD, (see above for explanation) recorded for the operational period to the total DDD value already held in the system for that HVAC component. The higher the DDD the more the schedule is unfulfilled, indicating an underperforming system. The continued monitoring of the HVAC component may include analysing the DDD over time to determine whether it is increasing (which would indicate the HVAC component is degrading).

Alternatively, step 1265 could include adding the Demand Degree Day, DDD, (the number of degree days taken between the target temperature and the room temperature) recorded for the operational period to the total DDD already held in the system for that HVAC component and determining whether the total DDD is above a certain threshold.

If the failure was classified as unidentified at step 1260, it means that further analysis is required to identify what the fault with the HVAC component might be. Therefore the process continues to step 1270 where it is determined whether there is a test that can be performed to identify the failure. In some cases, the HVAC monitoring system may have identified a possible failure type but there may not yet be enough data to confirm it so the test may comprise gathering more data. If there is a test that can be performed to identify the failure the process continues to step 1275. At step 1275 the user is informed that an unidentified or unconfirmed failure has occurred and they are asked for permission to perform a test of the HVAC system. The user may be informed of the specific test that is proposed. As before the user may be informed by a message to their smart device or on an in-home display. The method then continues to 1280 where it is determined whether the user has given permission to perform the test.

If the user has given permission for the test to be performed, the method proceeds to step 1290 and the test procedure is begun. More information about test procedures is set out below.

If at 1280 it is determined that the user has not given permission to perform a test the method continues to step 1255 where details of the failure are recorded and the HVAC component continues to be monitored.

Some failure modes might require a test procedure to confirm the failure or fault has been identified correctly. The user may be messaged with a suggestion that the system performs such a test, as described in relation to steps 1270 and 1275 of FIG. 12 above. In other circumstances a test procedure may be initiated by an engineer upon installing or repairing the HVAC component in order to ensure the HVAC component has been correctly installed or successfully repaired.

In another embodiment, given a pre-described knowledge of the house, a builder or engineer could install the HVAC device or system and then run one or more defined tests to check the operation of the HVAC system. This could confirm that the thermal characteristics of a (new/refurbished) house are as expected. Alternatively, the test could confirm that the HVAC component is installed correctly. In the latter case, the test procedure may take into account standardised parameters of the premises which have been obtained from records relating to previous operational periods of other HVAC devices at the same premises (e.g. a previously installed HVAC device which is now being replaced).

Figure 13:
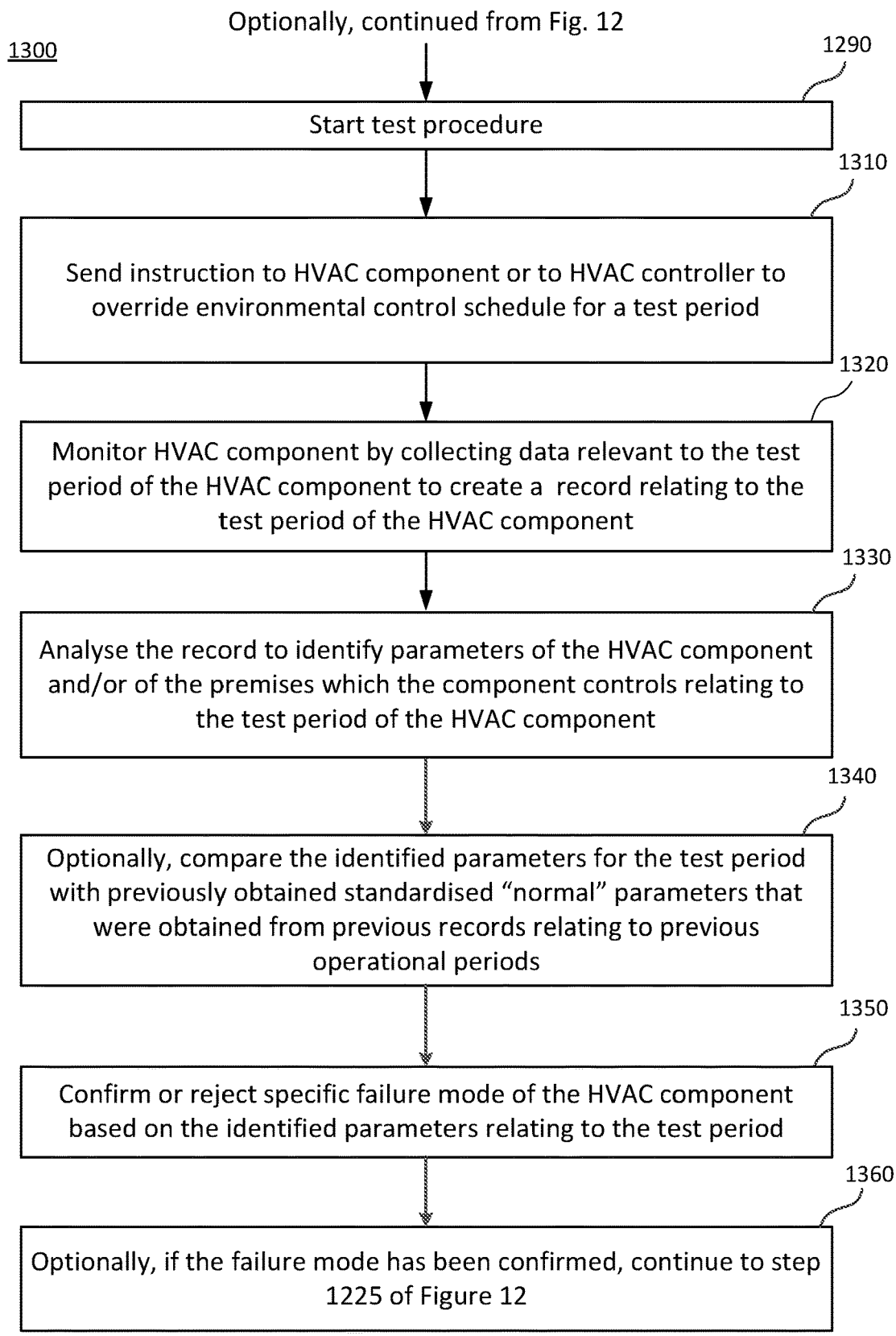
FIG. 13 is a flow diagram showing an exemplary test procedure for analysing faults in an environmental control system.

An example of a test procedure 1300 will now be described in relation to FIG. 13. If a user accepts or requests a test procedure, the test procedure will commence at step 1290 (see also FIG. 12).

At step 1310 an instruction is sent to the HVAC component to override the user's pre-programmed environmental control schedule. The test will last for a certain test period, which may be predetermined, or it may depend on the results of the test. The instruction may be sent as a message to the HVAC controller 120, or it may be sent directly to the HVAC component in question. For example, a message can be sent to a boiler controller (e.g. a smart thermostat) to override the user's schedule temporarily and run the test procedure by switching space heating on for 1 hour (the "test period"). Space heating for 1 hour would be expected to generate a specific change in room temperature (which may be calculated based on the standardised "normal" parameters of the HVAC component obtained in step 540 of method 500, see above).

At step 1320 the HVAC component is monitored by collecting data relevant to the test period. Normally this monitoring process would be conducted in the same manner as when a record of an operational period of the HVAC component is created, for example as described in relation to FIGS. 3 and 4. This record relating to the test period may, for example, include data collected during a pre-set period preceding the test period, as well as during a pre-set period subsequent to the test period.

At step 1330 the record relating to the test period of the HVAC component is analysed to identify parameters of the HVAC component and/or the premises. As described above in relation to step 520, these parameters may for example include the rate at which the premises heats up when the boiler is on (i.e. degrees change per hour).

At step 1340 the identified test period parameters may be compared with standardised "normal" parameters, obtained in step 540, in order to determine how much the test behaviour of the HVAC component diverges from normal behaviour. However this step may be omitted (particularly if no "normal" standardised parameters are available).

At step 1350 a specific failure mode of the HVAC component is confirmed or rejected. If the system had previously identified what the failure could potentially be (i.e. the operation period record showed some but not all the characteristics of a specific failure mode), the analysis of the test may be positive and it is possible to confirm that the HVAC device has failed in the suspected way. Alternatively, the test may show a negative result, which would indicate that the HVAC device is not experiencing the suspected fault/failure. If the failure had been in the unidentified category previously, the test results may allow the fault type to be identified and/or confirmed.

The confirmation or rejection of a failure type may be based on the results of the test period, as well as results of the operational period which triggered the test cycle and/or data from previous operational periods. It may also be based on identifying known trends found in the data of the record relating to the test period, for example pre-programmed fixed trends which are generic to all HVAC components (rather than to the specific monitored component and premises).

The user would then be messaged with the test result, for example by a message to their email address, to their personal device 190 (e.g. smartphone or tablet) or to a user interface within the premises 192. If the test cycle 1300 resulted in the confirmation of a failure mode, the method may proceed to step 1225 of FIG. 12, so that a message about a failed test can be sent to the user which incorporates a response section for authorising a request for an engineer to visit.

Figure 14:
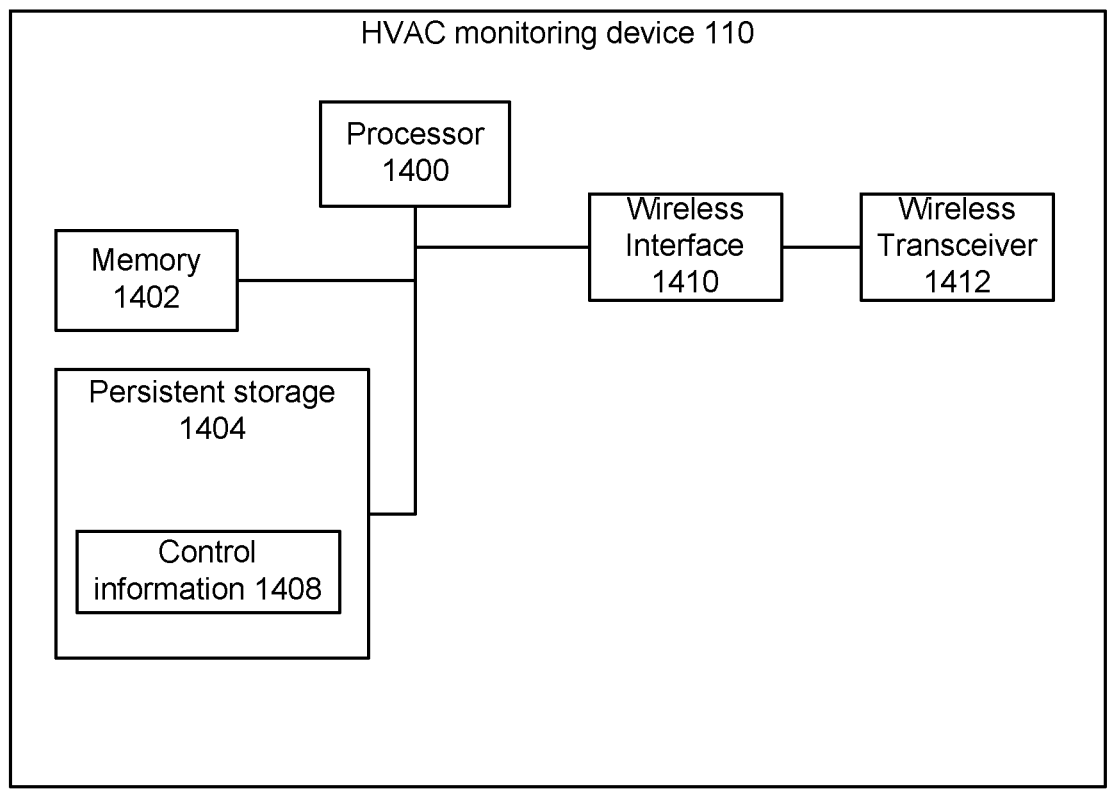
FIG. 14 illustrates the hardware architecture of an exemplary device for monitoring an HVAC or environmental control system.

FIG. 14 illustrates a hardware architecture of the HVAC monitoring device 110 that may be provided for monitoring an environmental control system, in conjunction with an HVAC controller (e.g. thermostat). The HVAC monitoring device 110 includes a processor 1400 together with volatile/random access memory 1402 for storing temporary data and software code being executed. Random access memory 1402 may be used to store continuously the rolling log of data from environmental sensors (e.g. temperature data). Persistent storage 1404 may store control information 1408, including the control schedule(s) programmed by the user into the HVAC controller 120 (see FIG. 1). Persistent storage 1404 may include other software and data, such as an operating system, device drivers, software configuration data, historical temperature measurement data, and the like.

As mentioned above in relation to FIG. 1, the control schedules may be received from the HVAC controller 120 or from the wireless receivers 130, 132, 134 (FIG. 1). In this case (the control schedules not being stored in the HVAC monitoring device 110), the HVAC monitoring device 110 may receive a message from one of the receivers 130, 132, 134 or from the HVAC controller 120 when the HVAC components are switched on or off. This message may also include some details of the environmental control schedule (e.g. what the target temperature or humidity is) so that only temporary copies of the information are stored at the thermostat (e.g. in memory 1402).

Communication with the wireless receivers 130, 132, 134, the HVAC controller 120 and the sensors 112, 114 (FIG. 1) occurs via a wireless network interface 1410 and wireless transceiver 1412.

Environmental sensors 112, 114 (FIG. 1) measure the ambient temperature and humidity and provide the environmental characteristic information to HVAC monitoring device 110 via the wireless transceiver 1412 and the wireless interface 1410. This information is passed to the processor 1400, which stores the information in memory 1402 and/or persistent storage 1404 for use in controlling the heating system.

As explained above, in some embodiments the sensors may be incorporated into the HVAC monitoring device.

The device components are interconnected by a data bus (this may in practice consist of several distinct buses such as a memory bus and I/O bus).

While a specific architecture is shown, any appropriate hardware/software architecture may be employed. For example, external communication may be via a wired network connection.

As mentioned above, instead of being provided separately as an additional "Internet of Things" component and linked into the smart thermostat ecosystem via the wireless local area network (WLAN) at the premises the HVAC monitoring device 110 could be embedded within a smart thermostat (HVAC controller 120).

Figure 15A:
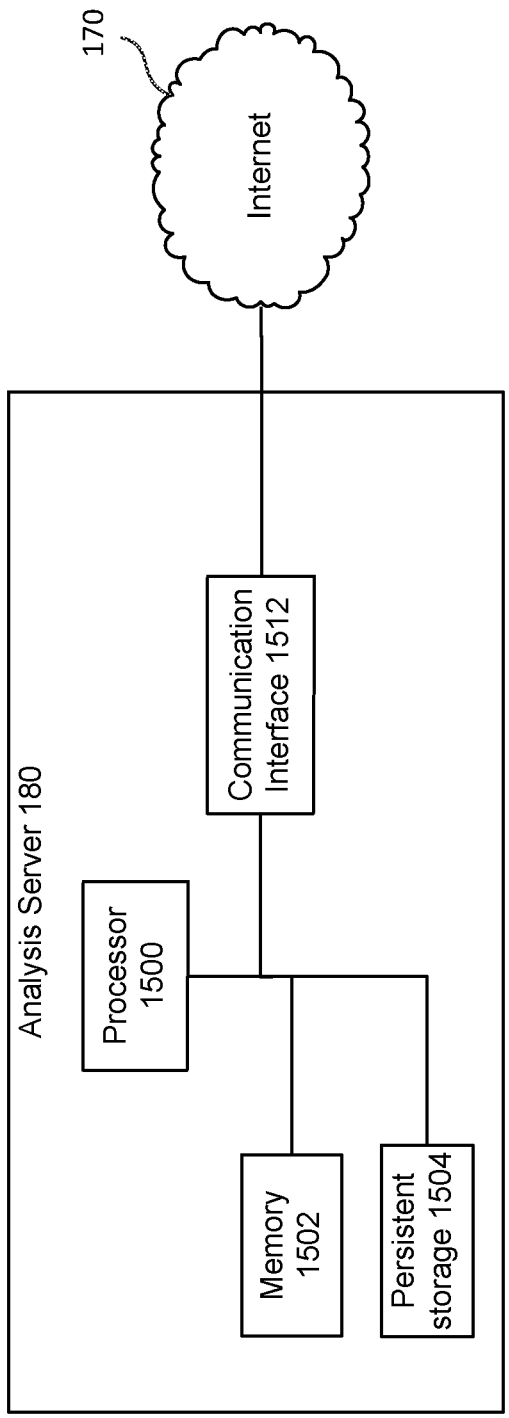
FIG. 15A illustrates the hardware architecture of an exemplary datacentre for monitoring HVAC or environmental control systems.

FIG. 15A illustrates a hardware architecture of the remote datacentre (analysis server 180) shown in FIG. 1. The analysis server 180 comprises at least one communication interface 1512 for connection with the Internet 170. Via the connection with the Internet 170, the remote datacentre 180 can communicate with HVAC monitoring devices 110 (FIG. 1) in numerous different premises.

The analysis server 180 includes a processor 1500 together with volatile/random access memory 1502 for storing temporary data and software code being executed. Random access memory 1502 may be used to store data temporarily (for example the rolling log of data from environmental sensors in embodiments in which the sensor data for the log is continuously sent to the analysis server 180 from the HVAC monitoring devices 110).

Persistent storage 1504 (e.g. in the form of disk storage or FLASH memory) may persistently store control information, such as logic for analysing environmental data.

Figure 15B:
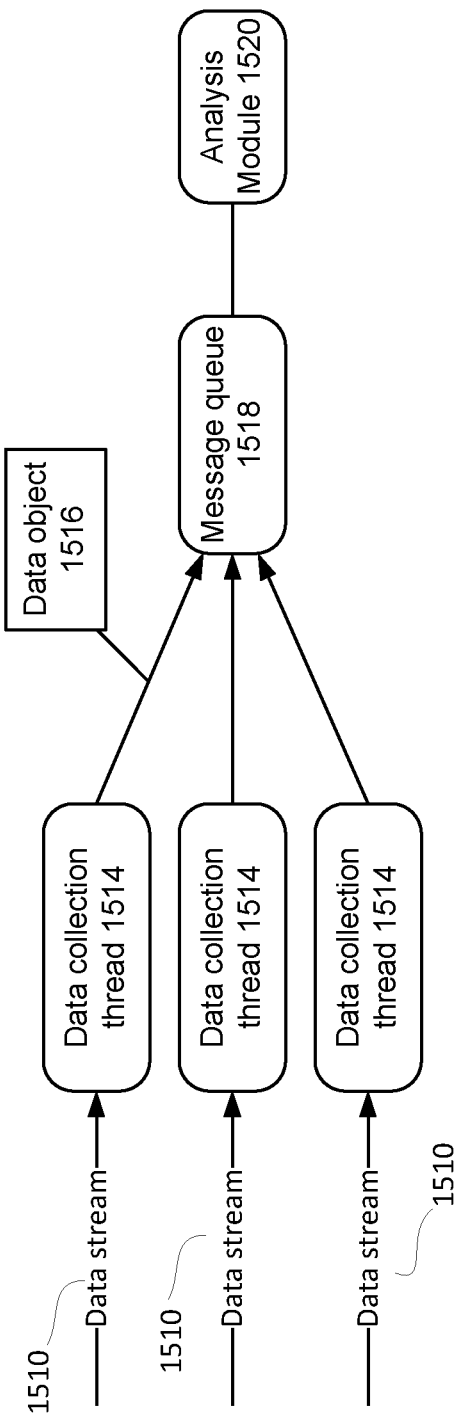
FIG. 15B illustrates the software architecture of an exemplary datacentre for monitoring HVAC or environmental control systems.

FIG. 15B illustrates a software architecture of the analysis server 180 shown in FIG. 1.

A data stream 1510 is sent from each house or property to the analysis server 180. Each individual house is monitored by a different data collection thread 514 at the analysis server 180. The analysis server 180 may maintain a log of recorded environmental characteristic values and target characteristic values over a given time period. For example, the log may consist of room temperature readings for the preceding 30 minute period. In other embodiments, the HVAC monitoring device may only pass this data onto the remote datacentre 180 once the HVAC component has been activated and an activation period has begun.

An alert can be triggered by receipt of an activation (e.g. "Boiler On") command, or characteristic diverging from the scheduled/requested target (e.g. room temperature falling below the target temperature). On activation of the activation trigger, the logged data from the preceding 30 minute time window is stored as a "data object" 1516; any new temperature data points are appended to the data object in real time. Another alert is triggered by a deactivation (e.g. "Boiler Off") command, or the environmental characteristic reaching its target (e.g. room temperature rising above the target temperature).

Once a data object 1516 has been created for an operational period of an environmental control system the data object 1516 is sent to a message queue 1518 (which may be a real-time message queue), and subsequently passed to an analysis module 1520 within the analysis server 180 for analysis. The analysis module 1520 analyses the monitored environmental characteristic values (e.g. temperature values) recorded in the data object 1516 to identify and classify underperformance or failure conditions as previously described.

A small random sample of all classified heating periods may be anonymised and made visible to an operator of the analysis server 180 for validation. Properties where a failure has been identified can be put on a watch list for more regular future random sampling by an operator.

Whilst described mainly in the context of domestic HVAC systems, the invention may also be used in office environments or anywhere with temperatures or other environmental characteristics to be controlled.

The above embodiments and examples are to be understood as illustrative examples. Further embodiments, aspects or examples are envisaged. It is to be understood that any feature described in relation to any one embodiment, aspect or example may be used alone, or in combination with other features described, and may also be used in combination with one or more features of any other of the embodiments, aspects or examples, or any combination of any other of the embodiments, aspects or examples. Furthermore, equivalents and modifications not described above may also be employed without departing from the scope of the invention, which is defined in the accompanying claims.

The invention claimed is:

1. A method of monitoring the performance of an environmental control system arranged to control at least one environmental characteristic in an environment, the method comprising:
    periodically recording sensor data relating to an environmental characteristic from at least one environmental sensor in a sensor log;
    identifying an activation period during which an environmental control system is expected to be activated to control the environmental characteristic;
    in response to identifying the activation period, generating a data set of sensor data measured during the activation period relating to the environmental characteristic based on the sensor log and recording the data set of sensor data;
    in response to identifying a start of the activation period:
        adding previously recorded sensor data for a predetermined duration prior to the start of the activation period from the log to the data set for analysis;

adding further sensor data received during the activation period to the data set;

after detection of an end of the activation period, continuing to store sensor data received from the environmental sensor to the data set; and terminating recording of sensor data to the data set a predetermined duration after the end of the activation period;

receiving control data indicating a target value configured at the environmental control system for the environmental characteristic;

analysing the data set in dependence on the target value to determine whether the sensor data within the data set is consistent with an expected response of the environmental characteristic during the activation period; and detecting an underperformance condition in response to determining that the sensor data within the data set is not consistent with the expected response.

2. A method according to claim 1, wherein identifying the activation period comprises detecting a start and/or an end of the activation period.

3. A method according to claim 2, wherein one or both of the start and the end of the activation period are detected in dependence on a control signal used to control the environmental control system.

4. A method according to claim 1, wherein one or both of a start and an end of the activation period are detected in dependence on a change in the target value specified in the control data and/or a difference between the target value and a current value of the environmental characteristic.

5. A method according to claim 1, comprising one or both of:

inferring a start of the activation period in response to detecting a current measured value of the environmental characteristic not meeting the target value;

inferring an end of the activation period in response to detecting a current measured value of the environmental characteristic meeting the target value.

6. A method according to claim 1, wherein receiving control data comprises accessing a control schedule configured at the environmental control system, the control schedule specifying one or more control set points, each control set point specifying a target value for the environmental characteristic applicable at a respective time.

7. A method according to claim 1, wherein the environmental characteristic is a temperature of the environment, and wherein a control set point or the target value specifies a target temperature for the environment.

8. A method according to claim 1, wherein the analysed data set comprises one or both of:

sensor data for a period preceding the start of the activation period;

sensor data for a period following the end of the activation period.

9. A method according to claim 1, wherein the analysing step comprises determining whether the sensor data within the data set indicates that the target value is substantially attained and/or maintained during the activation period, and wherein the detecting step comprises detecting an underperformance condition in response to the target value not being substantially attained and/or maintained during the activation period.

10. A method according to claim 1, wherein the analysis of the data set determines underperformance conditions based on one or more of:

a duration of the activation period;

a change of the environmental characteristic over the course of the activation period;

a rate of change of the environmental characteristic during the activation period;

a difference between one or more measured values of the environmental characteristic during the activation period and the target value, and/or an average or integral of said difference over the activation period.

11. A method according to claim 1, wherein analysing the sensor data to determine whether the sensor data within the data set is consistent with an expected response of the environmental characteristic during the period comprises determining whether the sensor data within the data set meets at least one of a set of one or more predetermined fault conditions.

12. A method according to claim 11, wherein the environmental characteristic is temperature, the predetermined fault conditions comprising one or more of:

detecting a lack of increase in temperature or a reduction in temperature during the activation period, the activation period intended to increase the temperature;

detecting a lack of reduction in temperature or an increase in temperature during the activation period, the activation period intended to reduce the temperature;

detecting a steady state temperature achieved or maintained during the activation period which differs from a target value specified in a control schedule by more than a threshold amount;

detecting a temperature change indicative of activation of the environmental control system in a period immediately preceding or following the activation period;

detecting an irregular pattern of temperature variation during the activation period;

detecting a correlation between environmental temperature variations during the activation period and the operation of, or a control signal intended for the operation of, a system other than an environmental temperature control component intended to regulate the environmental temperature.

13. A method according to claim 1, comprising alerting a user associated with the environmental control system in response to detecting the underperformance condition, the alerting comprising one or more of:

displaying an alert on a display associated with the environmental control system; and transmitting an alert message to a user device associated with the user.

14. A method according to claim 1, comprising, in response to detecting the underperformance condition, initiating a test procedure for testing the environmental control system, wherein the test procedure comprises:

activating the environmental control system;

measuring changes in the environmental characteristic in response to activation of the environmental control system; and performing further analysis of measured sensor data relating to the environmental characteristic to identify, quantify and/or classify the underperformance condition.

15. A method according to claim 1, comprising performing the analysis by an analysis module asynchronously with the data collection.

16. A method according to claim 1, comprising, at a data collection module:

detecting the activation period and storing the sensor data set relating to the activation period in a data object; and at an analysis module:

receiving the data object and performing the analysis of the sensor data.

17. A method according to claim 1, comprising, in response to determining that the data set is consistent with the expected response, analysing the data set to determine one or more thermal parameters of the environmental control system and/or the associated environment, and using the one or more thermal parameters in the analysing step for a subsequent activation period.

18. A computer-readable medium comprising software code adapted, when executed on a data processing apparatus, to perform the method of claim 1.

19. A system for monitoring the performance of an environmental control system arranged to control at least one environmental characteristic in an environment, the system comprising:
- a monitoring device comprising:
  - a sensor data recorder that periodically records sensor data relating to an environmental characteristic from at least one environmental sensor in a sensor log;
  - a processor for:
    - identifying an activation period during which the environmental control system is expected to be activated to control an environmental characteristic, and generating, in response to identifying the activation period, a data set of sensor data measured during the activation period relating to the environmental characteristic based on the sensor log; and
    - in response to identifying a start of the activation period:
      - adding previously recorded sensor data for a predetermined duration prior to the start of the activation period from the log to the data set for analysis;
      - adding further sensor data received during the activation period to the data set;
      - after detection of an end of the activation period, continuing to store sensor data received from the environmental sensor to the data set; and
      - terminating recording of sensor data to the data set a predetermined duration after the end of the activation period;
  - a memory for recording the sensor loci and the data set of sensor data measured during the activation period relating to the environmental characteristic; and
  - an interface for transmitting the data set to an analysis server for analysis; the analysis server comprising:
    - a server interface for receiving from the monitoring device the data set of sensor data relating to the environmental characteristic measured during an activation period of the environmental control system; and
    - a processor for analysing the data set in dependence on the target value to determine whether the sensor data within the data set is consistent with an expected response of the environmental characteristic during the activation period; and for detecting an underperformance condition in response to determining that the sensor data within the data set is not consistent with the expected response.

\* \* \* \* \*